US009155675B2

(12) United States Patent
Ye

(10) Patent No.: US 9,155,675 B2
(45) Date of Patent: Oct. 13, 2015

(54) PORTABLE ROBOTIC DEVICE

(71) Applicant: Board of Trustees of the University of Arkansas, Little Rock, AR (US)

(72) Inventor: Cang Ye, Little Rock, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 535 days.

(21) Appl. No.: 13/651,206

(22) Filed: Oct. 12, 2012

(65) Prior Publication Data

US 2013/0093852 A1    Apr. 18, 2013

Related U.S. Application Data

(60) Provisional application No. 61/546,422, filed on Oct. 12, 2011.

(51) Int. Cl.
*H04N 13/02* (2006.01)
*A61H 3/06* (2006.01)
*G01S 17/89* (2006.01)

(52) U.S. Cl.
CPC ............... *A61H 3/061* (2013.01); *A61H 3/068* (2013.01); *A61H 2003/063* (2013.01); *A61H 2201/5007* (2013.01); *A61H 2201/5048* (2013.01); *A61H 2201/5058* (2013.01); *A61H 2201/5084* (2013.01); *A61H 2201/5092* (2013.01); *A61H 2201/5097* (2013.01); *G01S 17/89* (2013.01); *G06T 2207/10016* (2013.01); *G06T 2207/10028* (2013.01); *G06T 2207/20076* (2013.01)

(58) Field of Classification Search
None
See application file for complete search history.

(56) References Cited

U.S. PATENT DOCUMENTS

| 6,549,122 B2* | 4/2003 | Depta .................... 340/407.1 |
| 2006/0098089 A1* | 5/2006 | Sofer ............................ 348/62 |
| 2012/0038549 A1* | 2/2012 | Mandella et al. ............. 345/156 |

OTHER PUBLICATIONS

Ye, C., Navigating a Mobile Robot by a Traversability Filed Histogram, IEEE Transactions on Systems, Man, and Cybernetics—Part B: Cybernetics, 2007, vol. 37, No. 2, 361-372.
Turchetto, R. et al., Visual Curb Localization for Autonomous Navigation, Proc. IEEE/RSJ International Conference on Intelligent Robots and Systems, 2003, 1336-1342.
Oggier, T. et al., SwissRanger SR3000 and First Experiences Based on Miniaturized 3D-TOF Cameras, Swiss Center for Electronics and Microtechnology (CSEM) Technical Report, 2005.
Ye, C. et al., Characterization of a 2-D Laser Scanner for Mobile Robot Obstacle Negotiation, Proc. IEEE International Conference on Robotics and Automation, 2002, 2512-2518.

(Continued)

*Primary Examiner* — Andy Rao
*Assistant Examiner* — Tyler Edwards
(74) *Attorney, Agent, or Firm* — Locke Lord LLP; Tim Tingkang Xia, Esq.

(57) ABSTRACT

A portable robotic device (PRD) as well as related devices and methods are described herein. The PRD includes a 3-D imaging sensor configured to acquire corresponding intensity data frames and range data frames of the environment. An imaging processing module configured to identify a matched feature in the intensity data frames, obtain sets of 3-D coordinates representing the matched feature in the range data frames, and determine a pose change of the PRD based on the 3-D coordinates; and perform 3-D data segmentation of the range data frames to extract planar surfaces.

28 Claims, 21 Drawing Sheets
(21 of 21 Drawing Sheet(s) Filed in Color)

α =40°: vertical view angle

(56) References Cited

OTHER PUBLICATIONS

Abrantes, A.J. et al., A Class of Constrained Clustering Algorithms for Object Boundary Extraction, IEEE Transactions on Image Processing, 1996, vol. 5, No. 11, 1507-1521.
Bellon, O.R.P. et al., New Improvements to Range Image Segmentation by Edge Detection, IEEE Signal Processing Letters, 2002, vol. 9, No. 2, 43-45.
Jiang, X., An Adaptive Contour Closure Algorithm and Its Experimental Evaluation, IEEE Transactions on Pattern Analysis and Machine Intelligence, 2000, vol. 22, No. 11, 1252-1265.
Sappa, A.D., Unsupervised Contour Closure Algorithm for Range Image Edge-Based Segmentation, IEEE Transactions on Image Processing, 2006, vol. 15, No. 2, 377-384.
Hoffman, R.L. et al., Segmentation and Classification of Range Images, IEEE Transactions on Pattern Analysis and Machine Intelligence, 1987, vol. 9, No. 5, 608-620.
Lee, K.M. et al., Robust Adaptive Segmentation of Range Images, IEEE Transactions on Pattern Analysis and Machine Intelligence, 1998, vol. 20, No. 2, 200-205.
Hoover, A. et al., An Experimental Comparison of Range Image Segmentation Algorithms, IEEE Transactions on Pattern Analysis and Machine Intelligence, 1996, vol. 18, No. 7, 673-689.
Silva, L. et al., A Global-To-Local Approach for Robust Range Image Segmentation, IEEE International Conference on Image Processing, 2002, 773-776.
Hegde, G.M. et al., SwissRanger SR-3000 Range Images Enhancement by a Singular Value Decomposition Filter, Proc. IEEE International Conference on Information and Automation, 2008, 1626-1631.
Malik, J. et al., Textons, Contours and Regions: Cue Integration in Image Segmentation, Proc. International Conference on Computer Vision, 1999, 918-925.
Shi, J. et al., Normalized Cuts and Image Segmentation, IEEE Transactions on Pattern Analysis and Machine Intelligence, 2000, vol. 22, No. 8, 888-905.
Sarkar, S. et al., Supervised Learning of Large Perceptual Organization: Graph Spectral Partitioning and Learning Automata, IEEE Transactions on Pattern Analysis and Machine Intelligence, 2000, vol. 22. No. 5, 504-525.
Wu, Z.-Y. et al., An Optimal Graph Theoretic Approach to Data Clustering: Theory and Its Application to Image Segmentation, IEEE Transactions on Pattern Analysis and Machine Intelligence, 1993, vol. 15, No. 11, 1101-1113.
Tao, W. et al., Color Image Segmentation Based on Mean Shift and Normalized Cuts, IEEE Transactions on Systems, Man, and Cybernetics, Part B, 2007, vol. 37, No. 5, 1382-1389.
Hegde, G.M. et al., An Extended Normalized Cuts Method for Real-Time Planar Feature Extraction from Noisy Range Images, Proc. IEEE International Conference on Intelligent Robots and Systems, 2010, 1190-1195.
Pulli, K. et al., Range Image Segmentation Based on Decomposition of Surface Normals, Proc. of the 8th Scandinavian Conference on Image Analysis, 1993, 893-899.
Cole, D. et al., Using Laser Range Data for 3D SLAM in Outdoor Environments, Proc. IEEE International Conference on Robotics and Automation, 2006, 1556-1563.
Wulf, O. et al., Benchmarking Urban Six-Degree-of-Freedom Simultaneous Localization and Mapping, Journal of Filed Robotics, 2008, vol. 25, No. 3, 148-163.
Pandey, G. et al., Visually Bootstrapped Generalized ICP, Proc. IEEE International Conference on Robotics and Automation, 2011, 2660-2667.
Cheng, Y. et al., Visual Odometry on the Mars Exploration Rovers—A Tool to Ensure Driving and Science Imaging, IEEE Robotics and Automation Magazine, 2006, vol. 13, No. 2, 54-62.
Agrawal, K. et al., Localization and Mapping for Autonomous Navigation in Outdoor Terrains: A Stereo Vision Approach, Proc. IEEE Workshop on Applications of Computer Vision, 2007.
Nister, D. et al., Visual Odometry, Proc. IEEE Conference on Computer Vision Pattern Recognition, 2004, 652-659.
Hirschmuller, H. et al., Fast, Unconstrained Camera Motion Estimation from Stereo without Tracking and Robust Statistics, Proc. International Conference on Control, Automation, Robotics and Vision, 2002, 1099-1104.
Comport, A.I. et al., Accurate Quadrifocal Tracking for Robust 3D Visual Odometry, Proc. IEEE International Conference on Robotics and Automation, 2007, 40-45.
Howard, A., Real-Time Stereo Visual Odometry for Autonomous Ground Vehicles, Proc. IEEE/RSJ International Conference on Intelligent Robots and Systems, 2008, 3946-3952.
Ye, C. et al., A Visual Odometry Method Based on the SwissRanger SR4000, Proc. Unmanned Systems Technology XII Conference at the 2010 SPIE Defense, Security, and Sensing Symposium.
Ellekilde, L.P. et al., Dense 3D Map Construction for Indoor Search and Rescue, Journal of Field Robotics, 2007, vol. 24, 71-89.
Zhou, W. et al., Information-Driven 6D SLAM Based on Ranging Vision, Proc. EEEE/RSJ International Conference on Intelligent Robots and Systems, 2008, 2072-2077.
Wang, J.J. et al., 3D Landmarks Extraction from a Range Imager Data for SLAM, Australian Conference on Robotics and Automation (ACRA), 2009.
Ye, C., Navigating a Portable Robotic Device by a 3D Imaging Sensor, Proc. EEEE Sensors Conference, 2010, 1005-1010.
Bay, H. et al., Speeded-Up Robust Features (SURF), Computer Vision—ECCV, 2006, 404-417.
Arun, K.S. et al., Least-Squares Fitting of Two 3-D Point Sets, IEEE Transactions on Pattern Analysis and Machine Intelligence, 1987, vol. 9, No. 5, 698-700.
Raguram, R. et al., A Comparative Analysis of RANSAC Techniques Leading to Adaptive Real-Time Random Sample Consensus, Computer Vision—ECCV, 2008, 500-513.
Thrun, S. et al., Stanley: The Robot that Won the DARPA Grand Challenge, J. Field Robotics, 2006, vol. 23, No. 9, 661-692.
Levine, S.P. et al., The NavChair Assistive Wheelchair Navigation System, IEEE Trans. Rehabilitation Engineering, 1999, vol. 7, No. 4, 443-451.
Kuo, C.-H, et al., Human-Oriented Design of Autonomous Navigation Assisted Robotic Wheelchair for Indoor Environments, Proc. IEEE Int. Conf. Mechatronics, 2006, 230-235.
Galindo, C. et al., A Control Architecture for Human-Robot Integration. Application to a Robotic Wheelchair, IEEE Transactions on Systems, Man, and Cybernetics—Part B: Cybernetics, 2006, vol. 36, No. 5, 1053-1067.
Ulrich, I. et al., The GuideCane—Applying Mobile Robot Technologies to Assist the Visually Impaired, IEEE Transaction on Systems, Man, and Cybernetics—Part B: Cybernetics, 2001, vol. 31, No. 2, 131-136.
Kulyukin, W. et al., Robot-Assisted Wayfinding for the Visually Impaired in Structured Indoor Environments, Autonomous Robots, 2006, vol. 21, No. 1, 29-41.
Bissit, D. et al., An Application of Bio-Feedback in the Rehabilitation of the Blind, Applied Ergonomics, 1980, vol. 11, No. 1, 31-33.
Benjamin, J.M. et al., A Laser Cane for the Blind, Proc. of San Diego Medical Symposium, 1973.
Yuan, D. et al., A Tool for Range Sensing and Environment Discovery for the Blind, Proc. IEEE Computer Society Conference on Computer Vision and Pattern Recognition Workshops, 2004.
Shoval, S. et al., Auditory Guidance with the NavBelt—A Computerized Travel Aid for the Blind, IEEE Transactions on Systems, Man, and Cybernetics, 1998, vol. 28, No. 3, 459-467.
Hesch, J.A. et al., A 3D Pose Estimator for the Visually Impaired, Proc. IEEE International Conference on Intelligent Robots and Systems, 2009.
Lowe, D.G., Distinctive Image Features from Scale-Invariant Keypoints, International Journal of Computer Vision, 2004, vol. 2, No. 60, 91-110.

\* cited by examiner (a)

(b)

(c)

Match after RANSAC

PORTABLE ROBOTIC DEVICE

CROSS-REFERENCE TO RELATED APPLICATIONS

This application claims priority to and the benefit of, pursuant to 35 U.S.C. §119(e), U.S. provisional patent application Ser. No. 61/546,422, filed on Oct. 12, 2011, entitled "SMART CANE FOR PEOPLE WITH VISUAL IMPAIRMENT AND APPLICATIONS," by Cang Ye, the disclosure of which is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is prior art to the disclosure described herein. All references cited and discussed in this specification are incorporated herein by reference in their entireties and to the same extent as if each reference was individually incorporated by reference. In terms of notation, hereinafter, "[identifier]" represent the corresponding reference cited in the reference lists. For example, "B[10]" represents the reference identified as B[10] in the Reference List B, namely, C. Ye and M Bruch, "A visual odometry method based on the Swiss-Ranger SR-4000," *Proc. Unmanned Systems Technology XII Conference at the* 2010 *SPIE Defense, Security, and Sensing Symposium.*"

STATEMENT OF FEDERALLY-SPONSORED RESEARCH

This invention was made with government support under NSF-IIS-1017672 awarded by the National Science Foundation. The government has certain rights in the invention.

FIELD

The present disclosure relates generally to navigational methods and apparatuses, and in particular to a Portable Robotic Device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Independent mobility is an important requirement for a person's daily life. Reduction in mobility due to visual impairment leads to severe deterioration in the quality of a person's life. Despite the substantial advances in computer vision and robotics, it is still extremely difficult for the visually impaired to move around independently in a 3D space. Up to date, white cane remains as the most efficient navigational tool to the visually impaired due to its powerful haptic feedback from the local environment and its low cost. However, a white cane has limitations in handling obstacle avoidance and wayfinding of pedestrian mobility. Obstacle avoidance deals with local problems in taking steps safely without bumping into anything, tripping, or falling. Wayfinding refers to global problems of planning and following routes from one point to another while maintaining awareness of current position and heading. A white cane is a low resolution device, i.e., one haptic "datum" per contact point. For obstacle detection and avoidance, it is difficult and time-consuming for the visually impaired to obtain the full picture of an obstacle by assembling haptic data from multiple locations. Also, it may miss an overhung obstacle. With respect to wayfinding, a white cane has a very limited range and it is too nearsighted for path planning. For instance, it may be difficult for the visually impaired to locate a distant doorway/stairway that may be used as a waypoint of a navigational task. A conventional white cane does not have wayfinding function unless the blind traveler uses a GPS. However, GPS does not work or work well in an indoor environment.

The computer vision and robotic technologies can be used to build a Robotic Navigational Device (RND) that replaces or enhances a white cane. The main challenge is that the portability requirement of an RND limits its size, computing power and power supply. These constraints exclude the possibility of adopting the approach of multiple sensors and high-end computers in military robots C[1]. As a result, an RNDs currently only offers very limited navigational aid to the visually impaired.

The RNDs can be classified into three categories: Robotic Wheelchair (RW) C[1, 2, 3], Robotic Guide-Dog (RGD) C[1, 2] and Electronic White Cane (EWC) C[1, 2, 3, 4]. A Portable Robotic Device (PRD) is referred to an RND that can be carried or worn by a person with visual impairment. Much research effort has been devoted to the RW approach in the past several decades. A RW is well suited for a blind person who loses the ability to move. However, a RW gives its user an unpleasant sense of being controlled. Given the reality that the current robotic assistive technology is inadequate for navigation in an unstructured environment, safety concerns will keep the visually impaired away from using RWs for their mobility needs. A RGD is a robotic device that indicates a traversable direction to a visually impaired person and guides him/her to the destination. In this case, the user needs to use his/her ability to move. A RGD can be passive or active. A passive RGD C[5] generates the travel direction to the user by steering its wheel, and the user needs to push the RGD forward. A passive RG gives its users a sense of safety that they are controlling the device, but it brings extra workload to users that may cause fatigue. An active RGD C[6], however, generates an additional forward movement that drags the user to the destination. In this way, the RGD can even take on a certain payload without requiring the user to push and thus it does not result in fatigue to the user. However, the robot-centric movement may create uncomfortable feelings in users as they may be dragged around at an uncomfortable pace. An EWC is a handheld/wearable device that detects the obstacle distance in its immediate surrounding. The Nottingham obstacle detector C[7] and the Navbelt C[10] use sonar for obstacle detection. The C-5 laser cane C[8] triangulates the range information using three laser diode transmitters and three photo-diode receivers. The "virtual white cane" C[9] senses range by a baseline triangulation system using a point laser and a miniaturized camera. The user receives multiple range measurements by swinging the device around. In spite of the advantage of portability, this kind of devices usually provides quite limited information to the user due to the limited sensing capability. It is generally impossible for them to perform efficient wayfinding function in a 3D space. Also, a handheld EWC may limit or deny the use of a traditional white cane.

A 3D pose (position and orientation) estimation method for the visually impaired is introduced in C[1] where a sensor package, comprising an Inertial Measurement Unit (IMU) and a 2D laser scanner, is mounted on a white cane to track its pose. The white cane's pose is estimated by integrating the IMU measurements over time and updated by the extended Kalman filter using the straight-line features extracted from the laser scans. The method requires a known map of the indoor environment to compute the intersection of the laser-scan plane and the structural planes of the environment. The use of a 2D laser scanner is still not sufficient for providing details and dimension of environment.

Therefore, a heretofore unaddressed need exists in the art to address the aforementioned deficiencies and inadequacies.

SUMMARY

Certain aspects of the present disclosure are directed to a portable robotic device (PRD). The PRD includes a 3-D imaging sensor configured to acquire first and second intensity data frames and first and second range data frames of an environment of the 3-D imaging sensor, the first intensity data frame corresponding to the first range data frame, the second intensity data frame corresponding to the second range data frame; and an imaging processing module configured to identify a first feature in the first intensity data frame and a second feature in the second intensity data frame that match each other, obtain a first set of 3-D coordinates representing the first feature in the first range data frame and a second set 3-D coordinates representing the second feature in the second range data frame, and determine a pose change of the PRD based on the first and second sets of 3-D coordinates; and perform 3-D data segmentation of at least one of the first and second range data frames to extract planar surfaces from the at least one range data frame.

In certain embodiments, the imaging processing module includes a Scale-Invariant Feature Transform (SIFT) feature detector configured to extract SIFT features in the first and second intensity data frames, wherein the imaging processing module is configured to identify the first and second features that are SIFT features and that match each other.

In certain embodiments, the imaging processing module is configured to execute the construction procedure for each point in the at least one range data frame; and construct a color image using the generated pixel for each point of the at least one range data frame. The imaging processing module is configured to apply a Normalized Cuts method to the color image.

In certain embodiments, the imaging processing module is configured to cluster a color image into a plurality of homogeneous regions by using a Mean Shift method. The imaging processing module is configured to construct a graph by treating each of the plurality of homogeneous regions as a node and recursively partition the graph into two segments using the Normalized Cuts method until each segment is planar or contains only one homogeneous region.

Certain embodiments of the present disclosure are directed to a smart cane system. The smart cane system includes a cane; a 3-D imaging sensor attached to the cane and configured to acquire intensity data frames and range data frames of an environment of the 3-D imaging sensor, the intensity data frames corresponding to the range data frames; a portable computing device configured to process the intensity data frames and range data frames as well as detect a pose of the imaging sensor and an obstacle in the environment based on the processing results; a headset in communication with the portable computing device and configured to output an audio instruction indicting information associated with the pose or the obstacle; and a tactile device in communication with the portable computing device and configured to output a tactile instruction indicting information associated with the pose or the obstacle.

In certain embodiments, the 3-D imaging sensor is configured to acquire first and second intensity data frames and first and second range data frames of the environment of the 3-D imaging sensor, the first intensity data frame corresponding to the first range data frame, the second intensity data frame corresponding to the second range data frame. The portable computing device is configured to identify a first feature in the first intensity data frame and a second feature in the second intensity data frame that match each other; obtain a first set of 3-D coordinates representing the first features in the first range data frame and a second set 3-D coordinates representing the second feature in the second range data frame, determine a pose change of the PRD based on the first and second sets of 3-D coordinates; and perform 3-D data segmentation of at least one of the first and second range data frames to extract planar surfaces from the at least one range data frame.

In certain embodiments, the portable computing device includes a Scale-Invariant Feature Transform (SIFT) feature detector configured to extract SIFT features in the first and second intensity data frames, wherein portable computing device is configured to identify the first and second features that are SIFT features and that match each other.

In certain embodiments, the portable computing device is configured to execute a construction procedure for a given point in the at least one range data frame including: mapping the given point to a corresponding point in a color space in accordance with a predetermined rule; and generating a pixel for the given point using a color represented by the corresponding point in the color space. In certain embodiments, the portable computing device is configured to: execute the construction procedure for each point in the at least one range data frame; construct a color image using the generated pixel for each point of the at least one range data frame; cluster the color image into a plurality of homogeneous regions by using a Mean Shift method; and recursively partition the color image into two segments using a Normalized Cuts method until each segment is planar or contains only one homogeneous region.

Certain embodiments of the present disclosure are directed to a method of navigation utilizing a navigational device including a 3-D imaging sensor and an imaging processing module. The method includes: acquiring, at the 3-D imaging sensor, first and second intensity data frames and first and second range data frames of an environment of the 3-D imaging sensor, the first intensity data frame corresponding to the first range data frame, the second intensity data frame corresponding to the second range data frame; identifying a first feature in the first intensity data frame and a second feature in the second intensity data frame that match each other; obtaining a first set of 3-D coordinates representing the first feature in the first range data frame and a second set 3-D coordinates representing the second feature in the second range data frame, and determine a pose change of the PRD based on the first and second sets of 3-D coordinates; and performing 3-D data segmentation of at least one of the first and second range data frames to extract planar surfaces from the at least one range data frame. In certain embodiments, the method includes: executing, at the imaging processing module, a construction procedure for each point in the at least one range data frame. The construction procedure for a given point in the at least one range data frame includes: mapping the given point to a corresponding point in a color space in accordance with a predetermined rule, and generating a pixel for the given point using a color represented by the corresponding point in the color space; constructing a color image using the generated pixel for each point of the at least one range data frame; clustering the color image into a plurality of homogeneous regions by using a Mean Shift method; and recursively partitioning the color image into two segments using a Normalized Cuts method until each segment is planar or contains only one homogeneous region.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following figures form part of the present specification and are included to further demonstrate certain aspects of the present invention. The invention may be better understood by reference to one or more of these figures in combination with the detailed description of specific embodiments presented herein. The drawings described below are for illustration purposes only. The drawings are not intended to limit the scope of the present teachings in any way.

Figure 1:
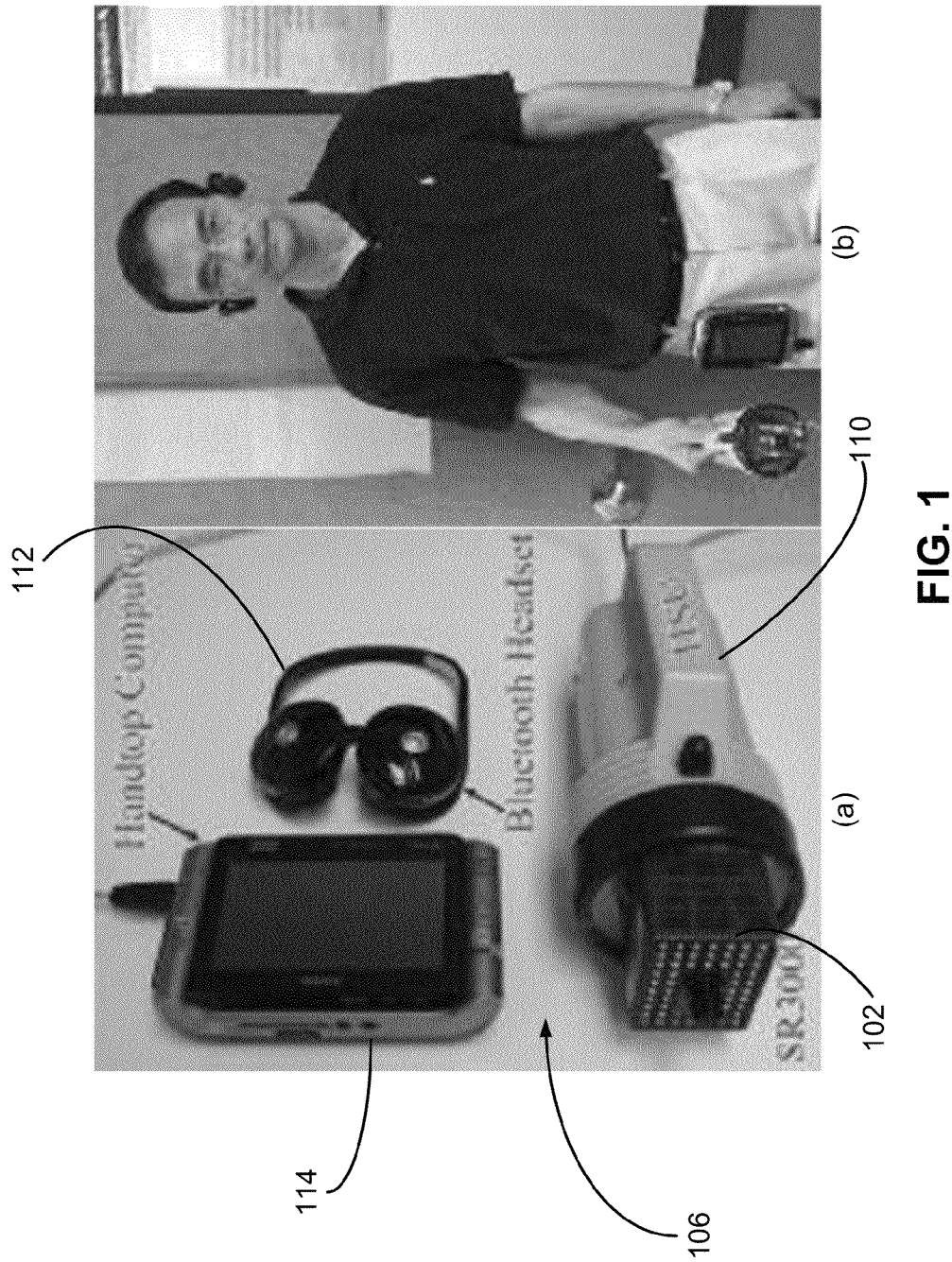
Figure 2:
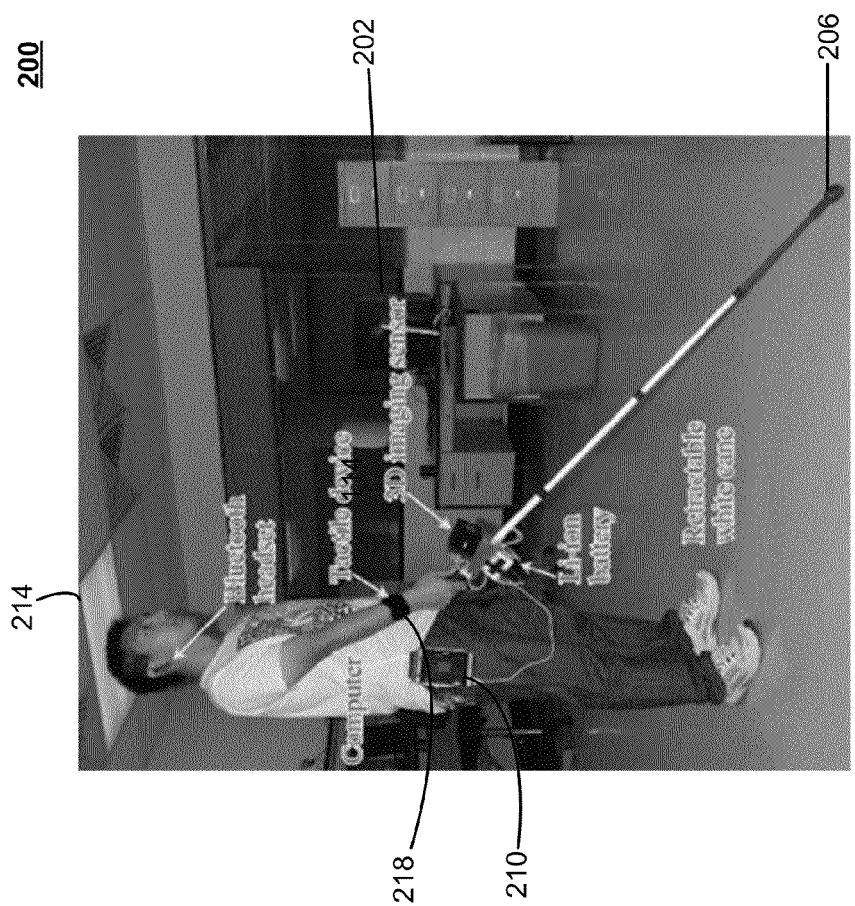
Figure 3:
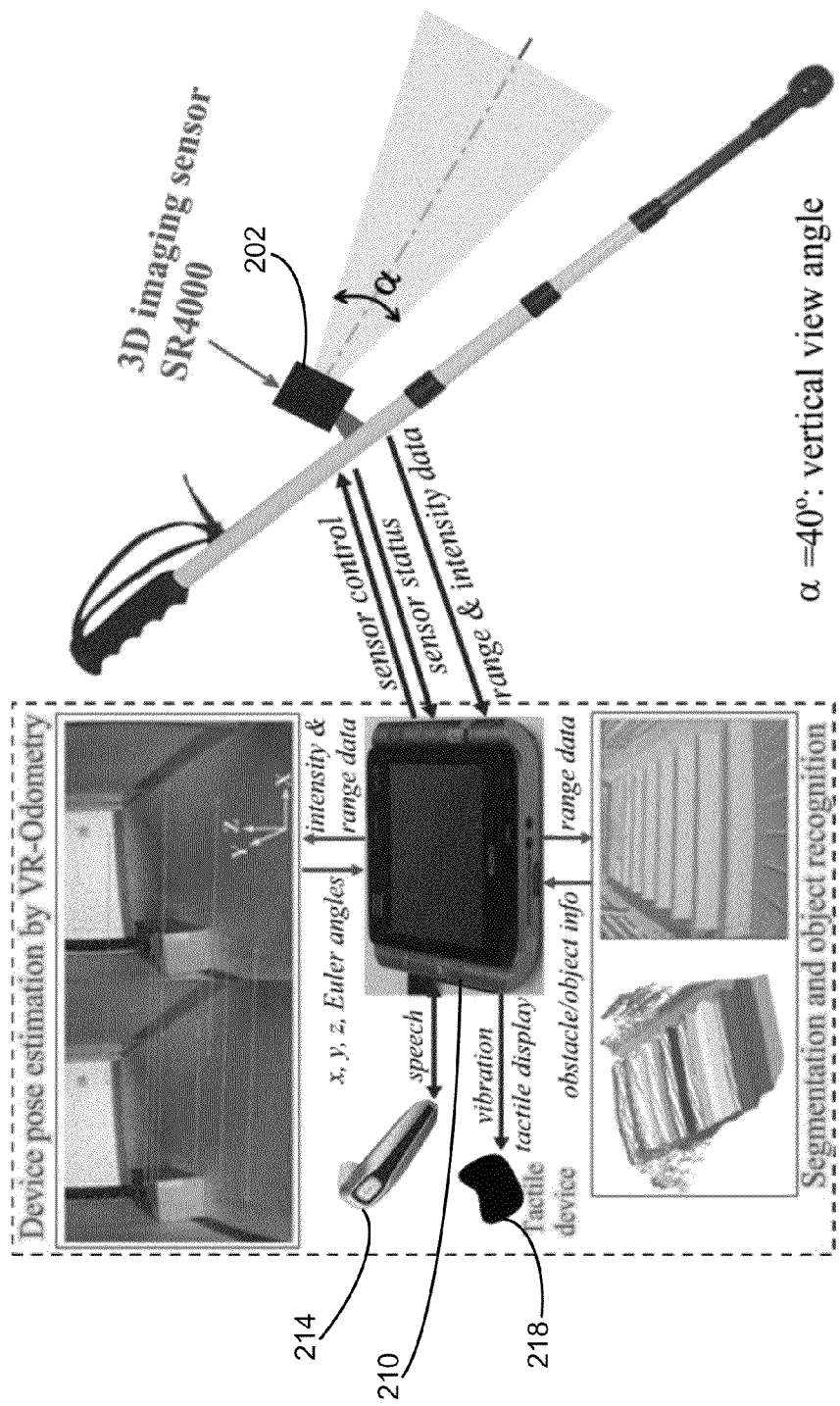
Figure 4:
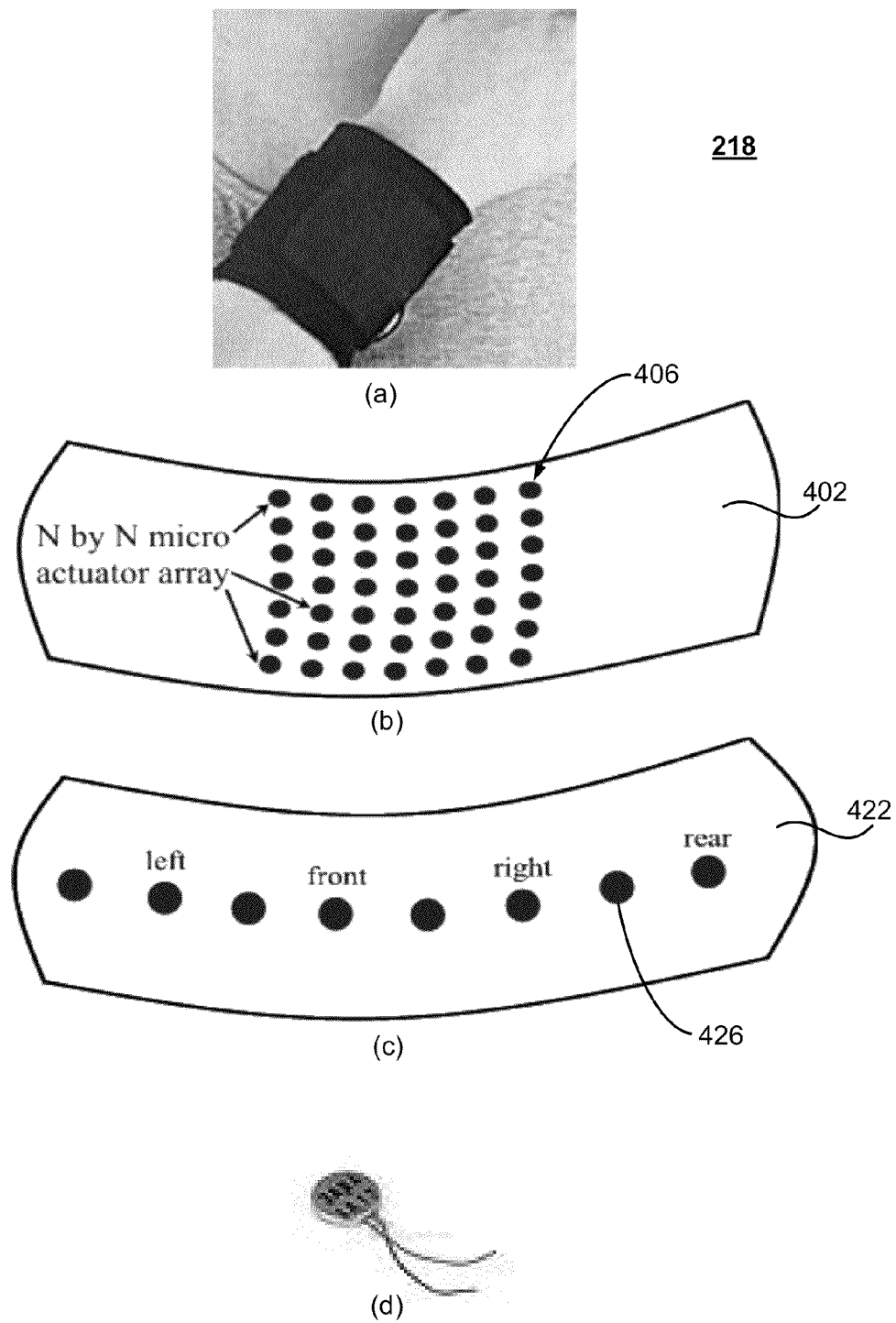
Figure 5:
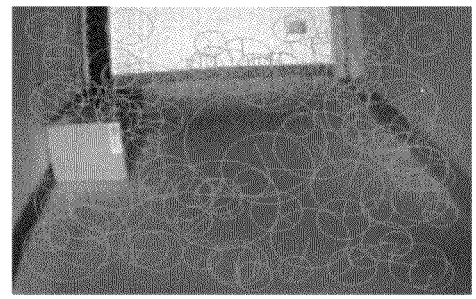
Figure 5:
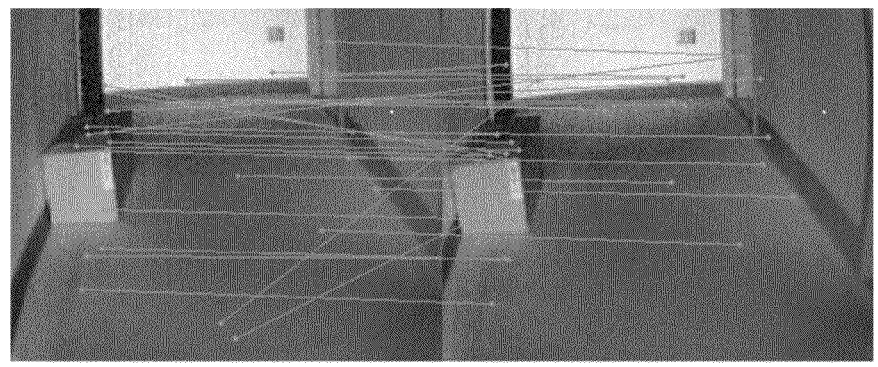
Figure 5:
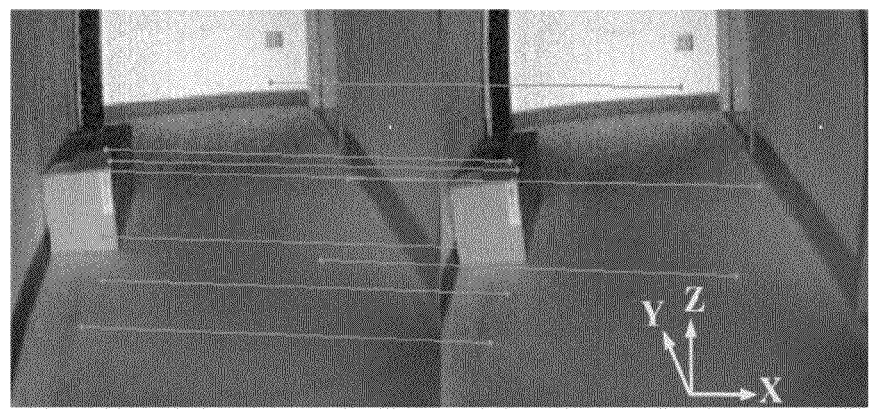
Figure 6:
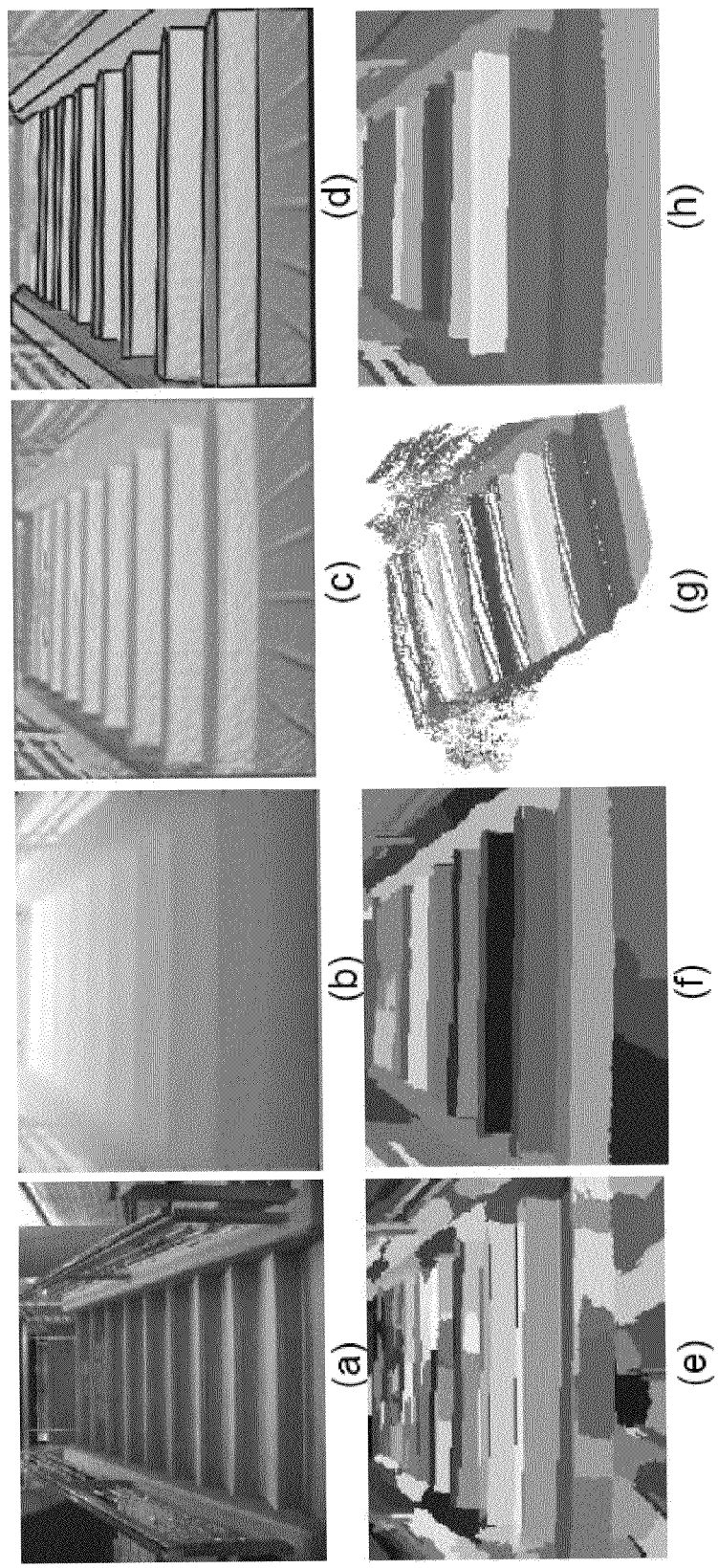
Figure 7:
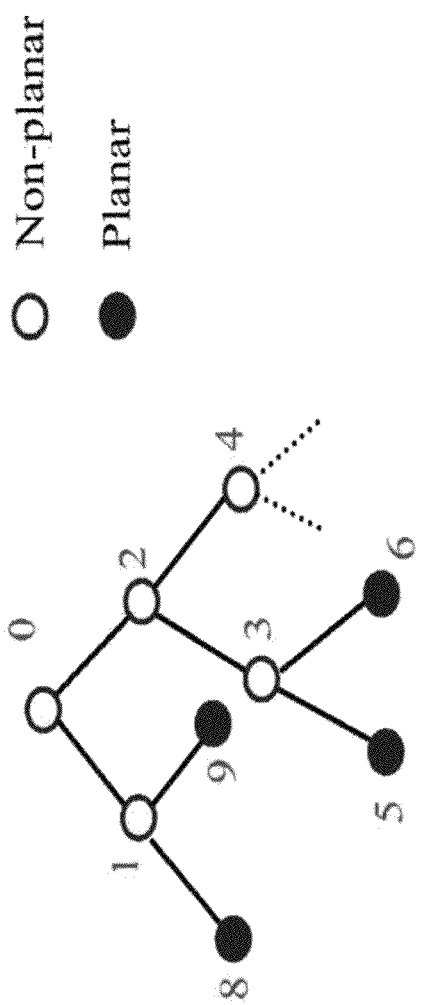
Figure 8:
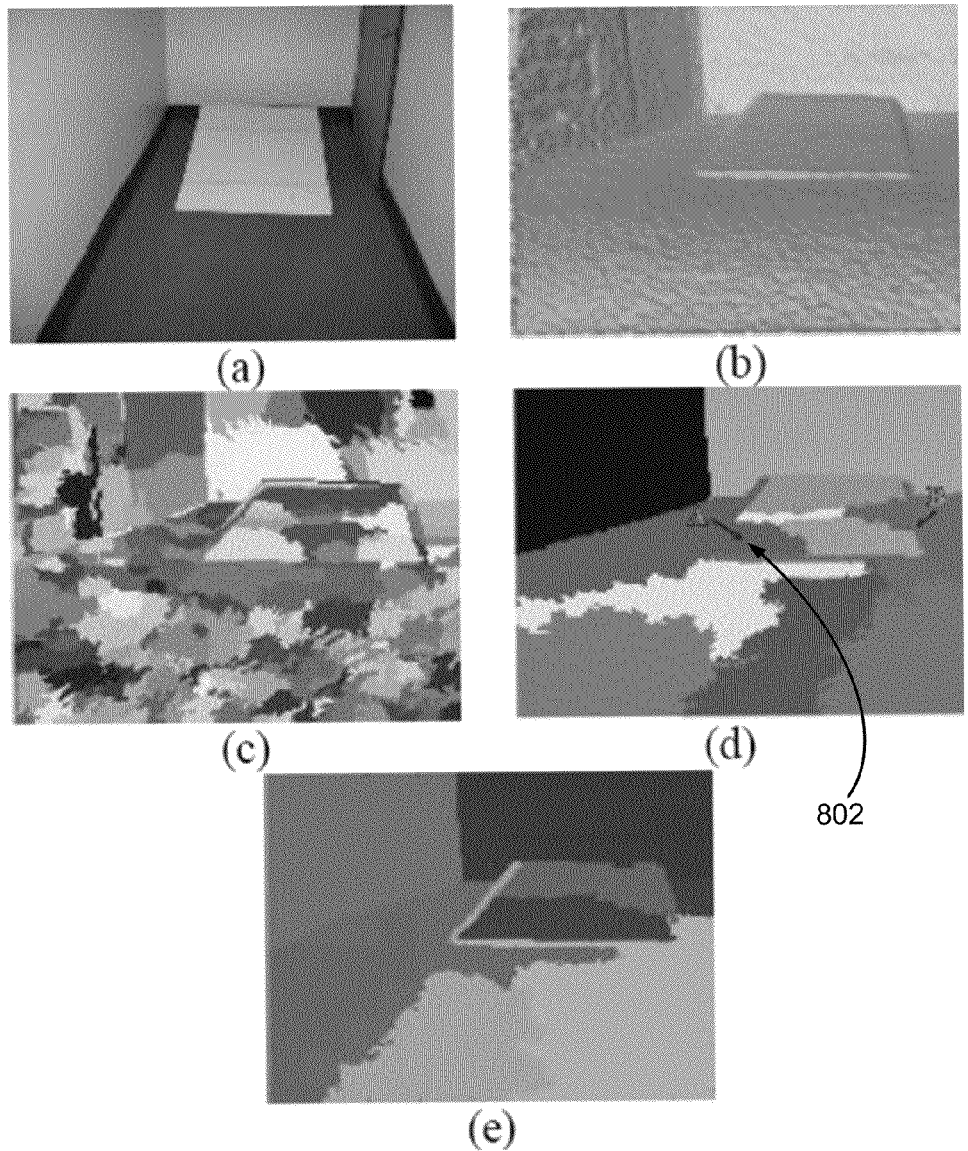
Figure 9:
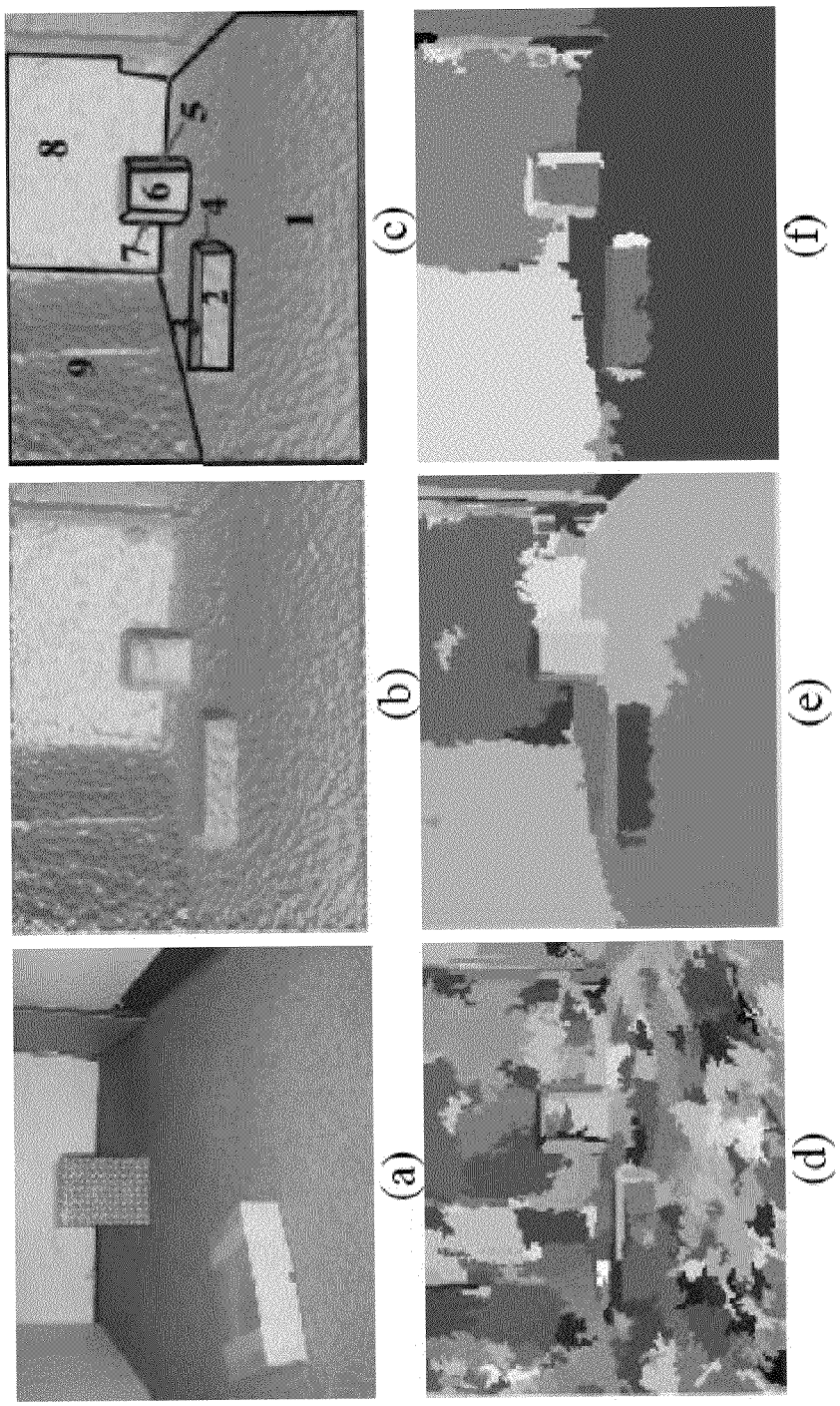
Figure 10:
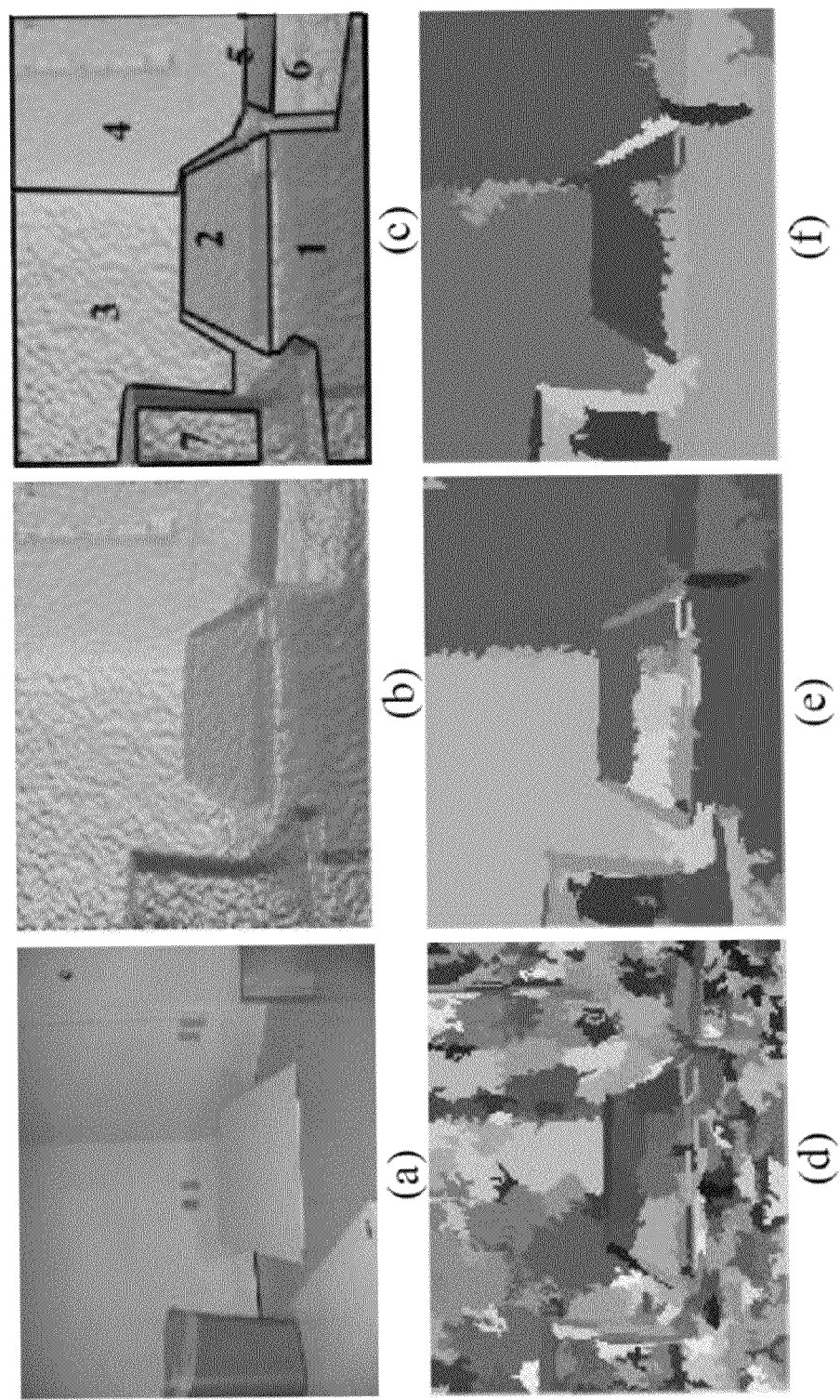
Figure 11:
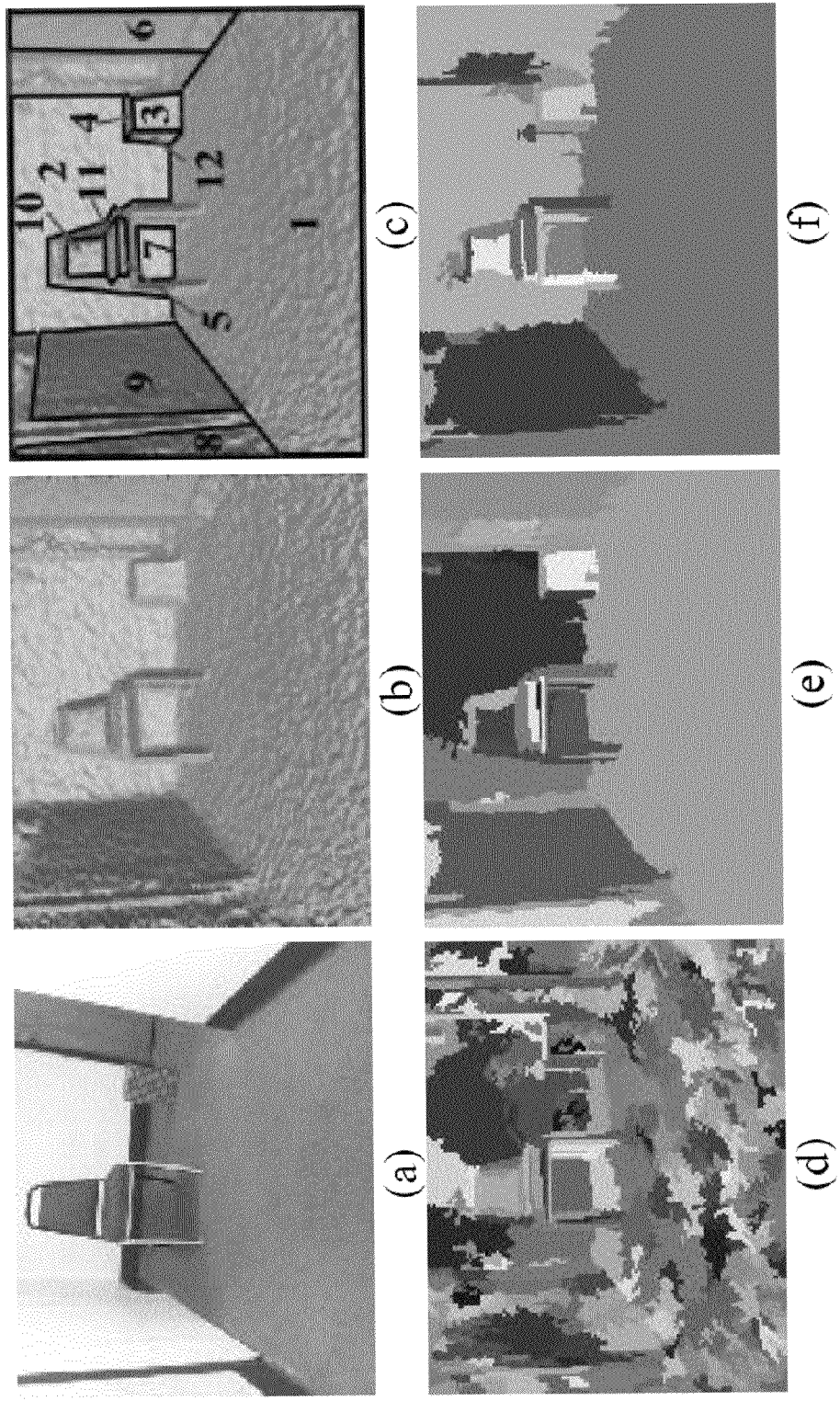
Figure 12:
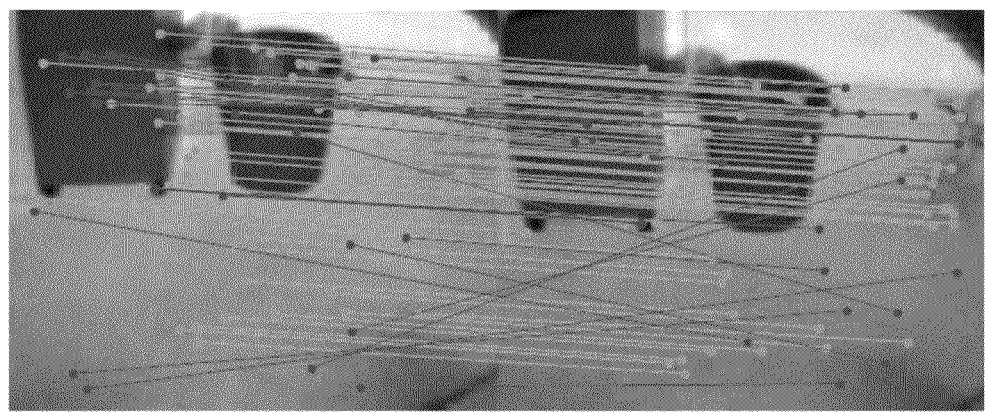
Figure 12:
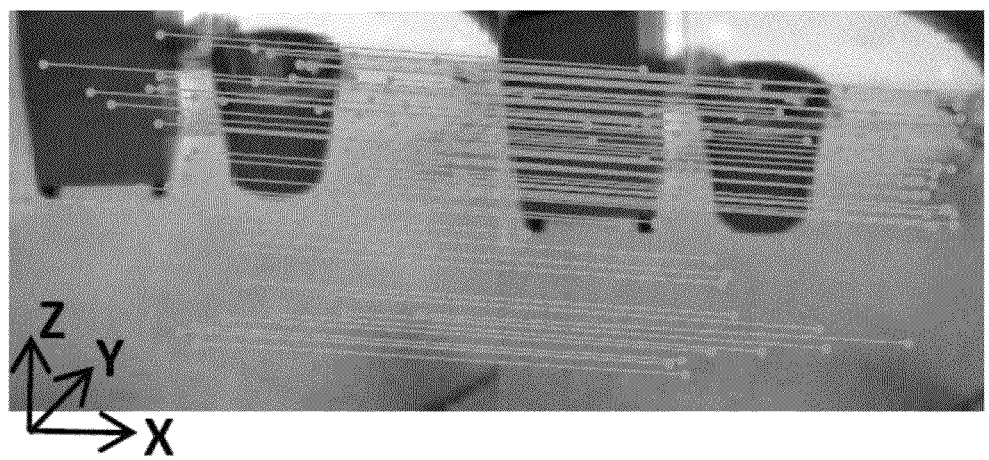
Figure 13:
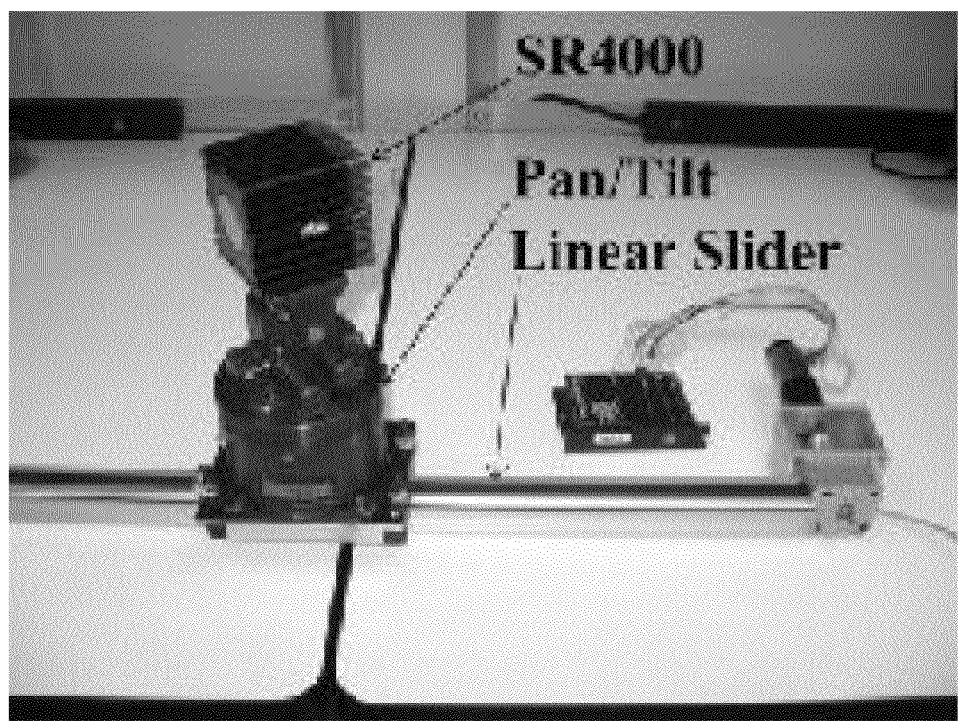
Figure 14A:
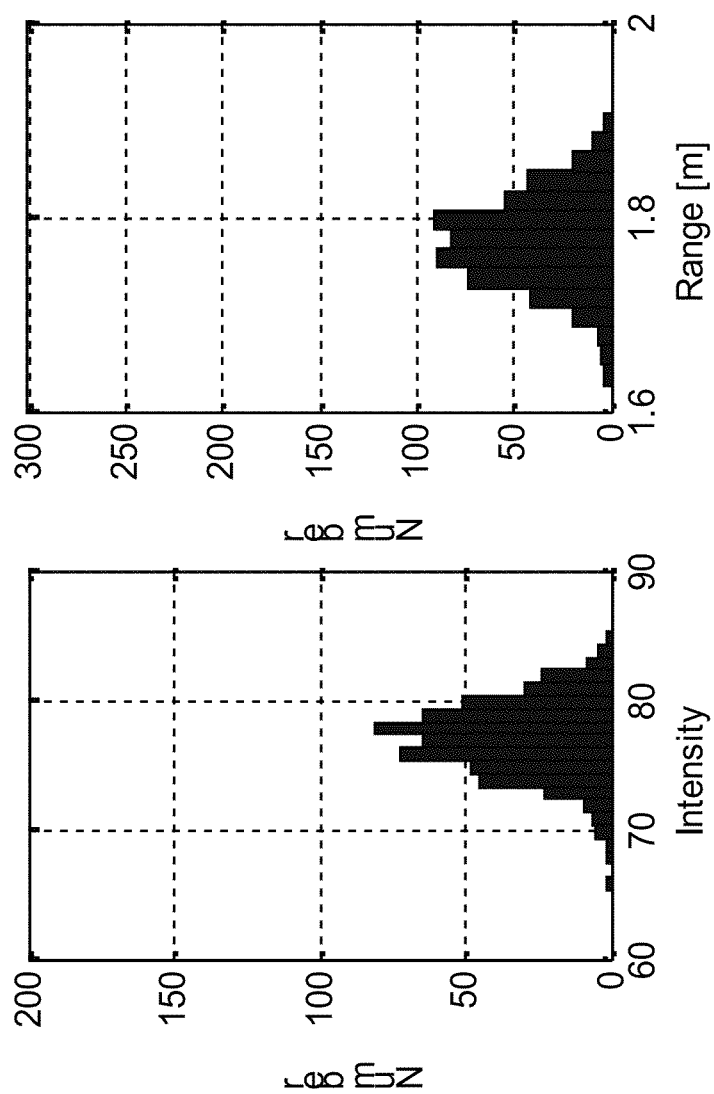
Figure 14B:
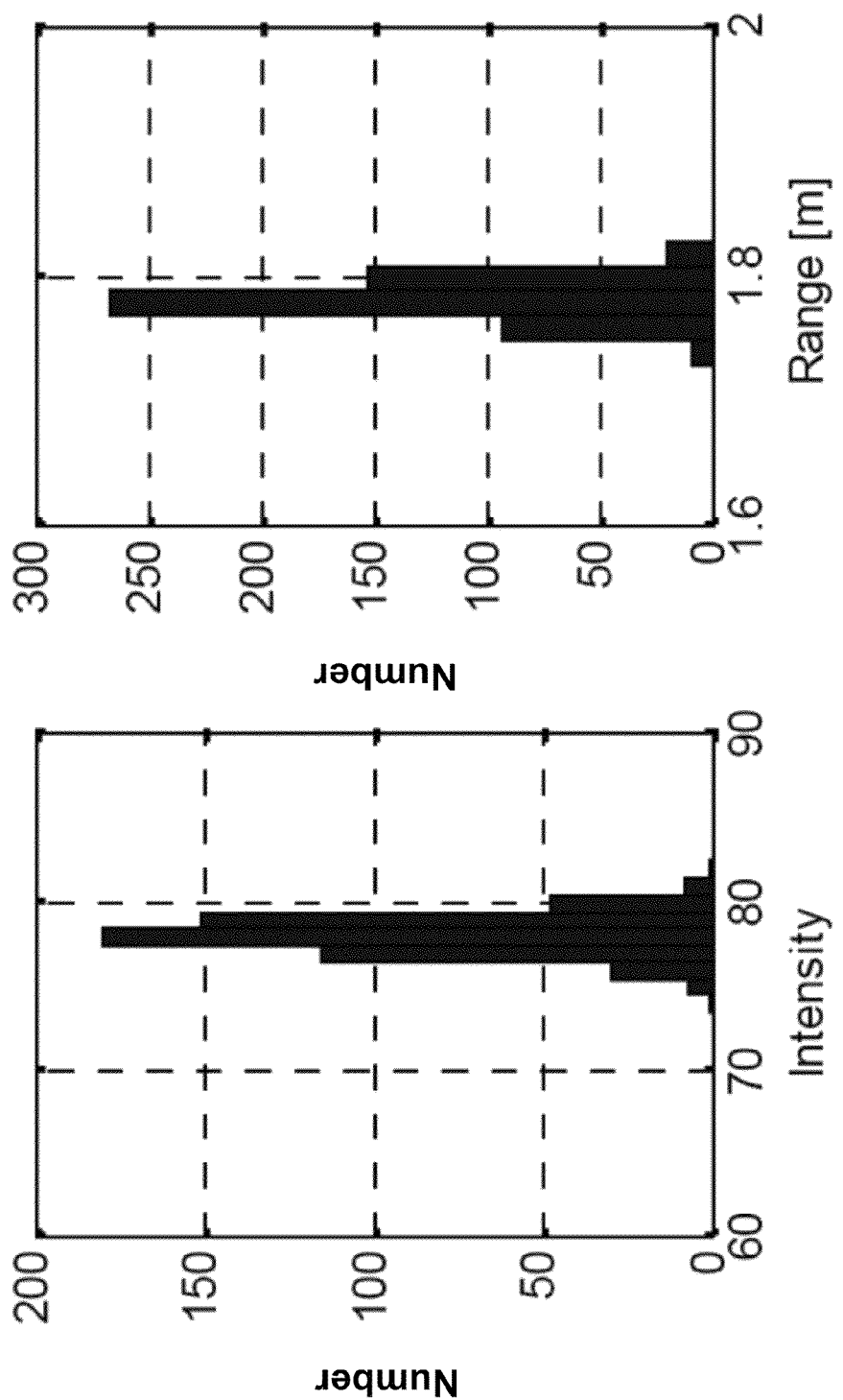
Figure 15:
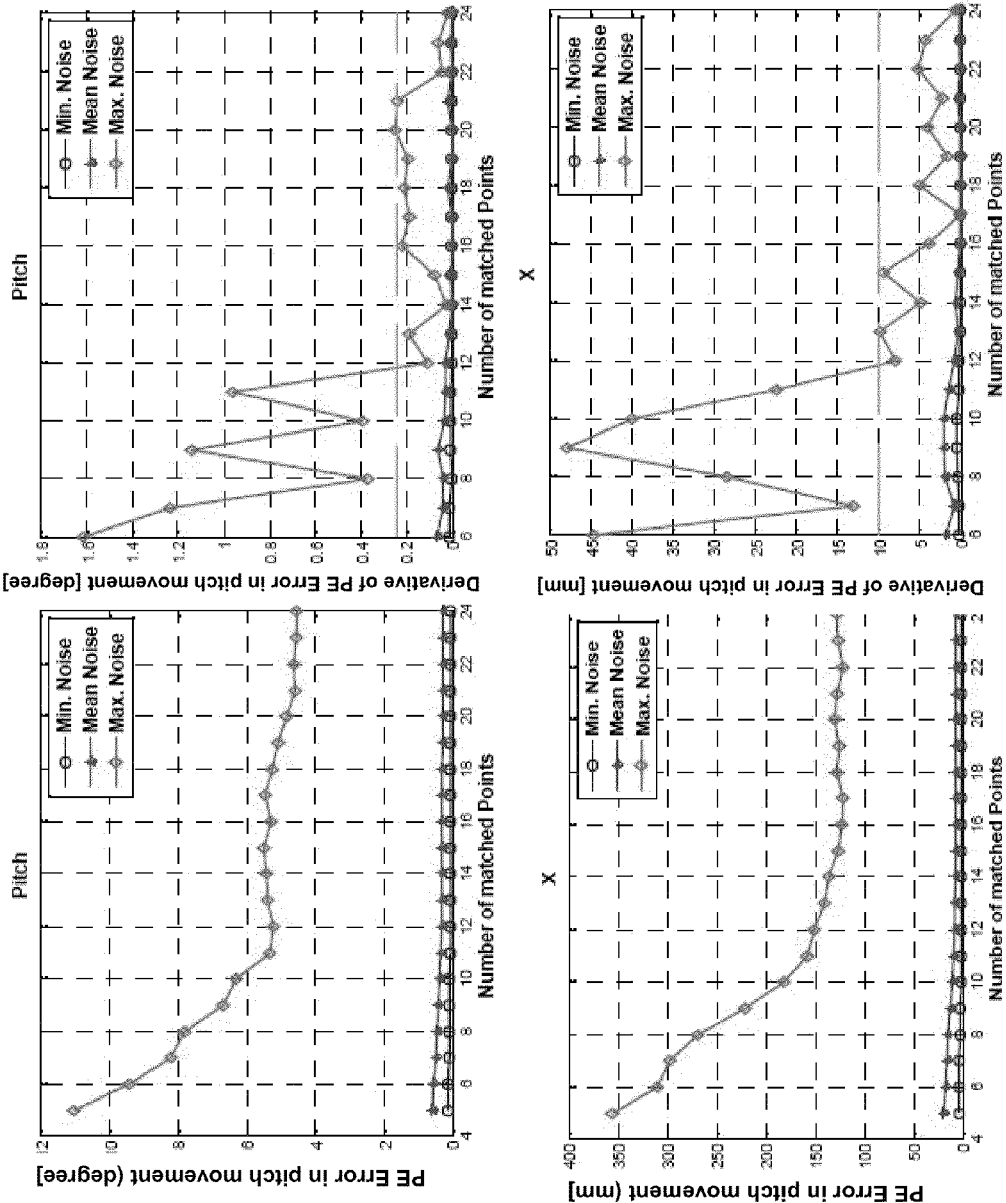
Figure 16:
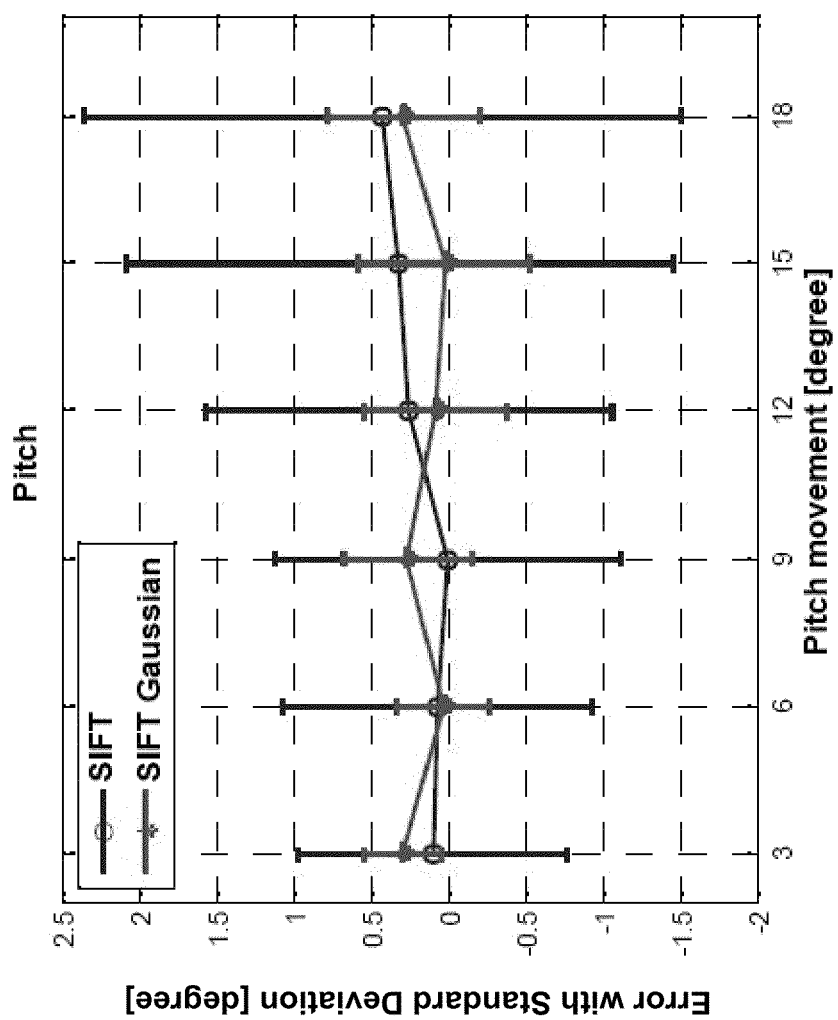
Figure 17:
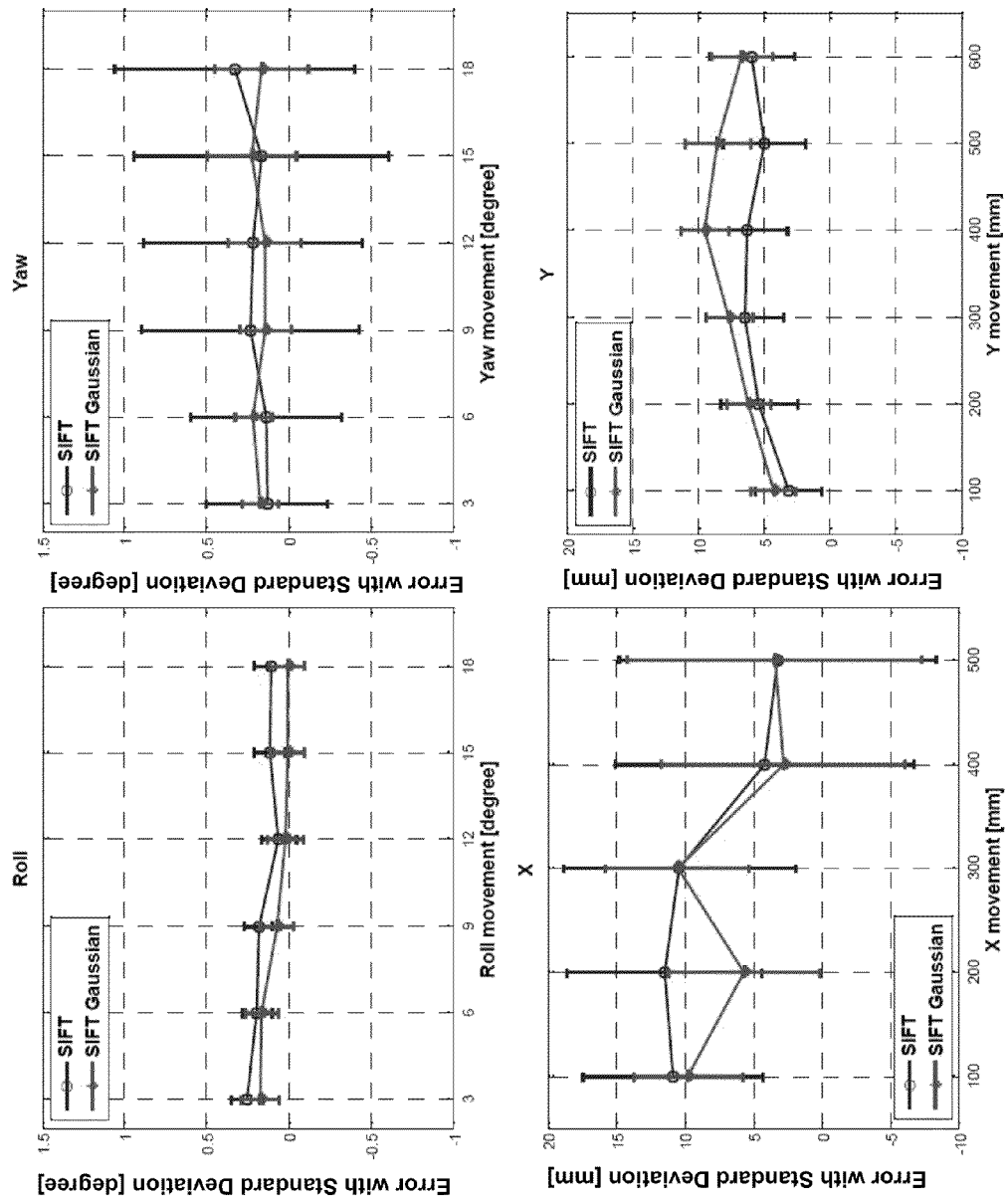
Figure 18:
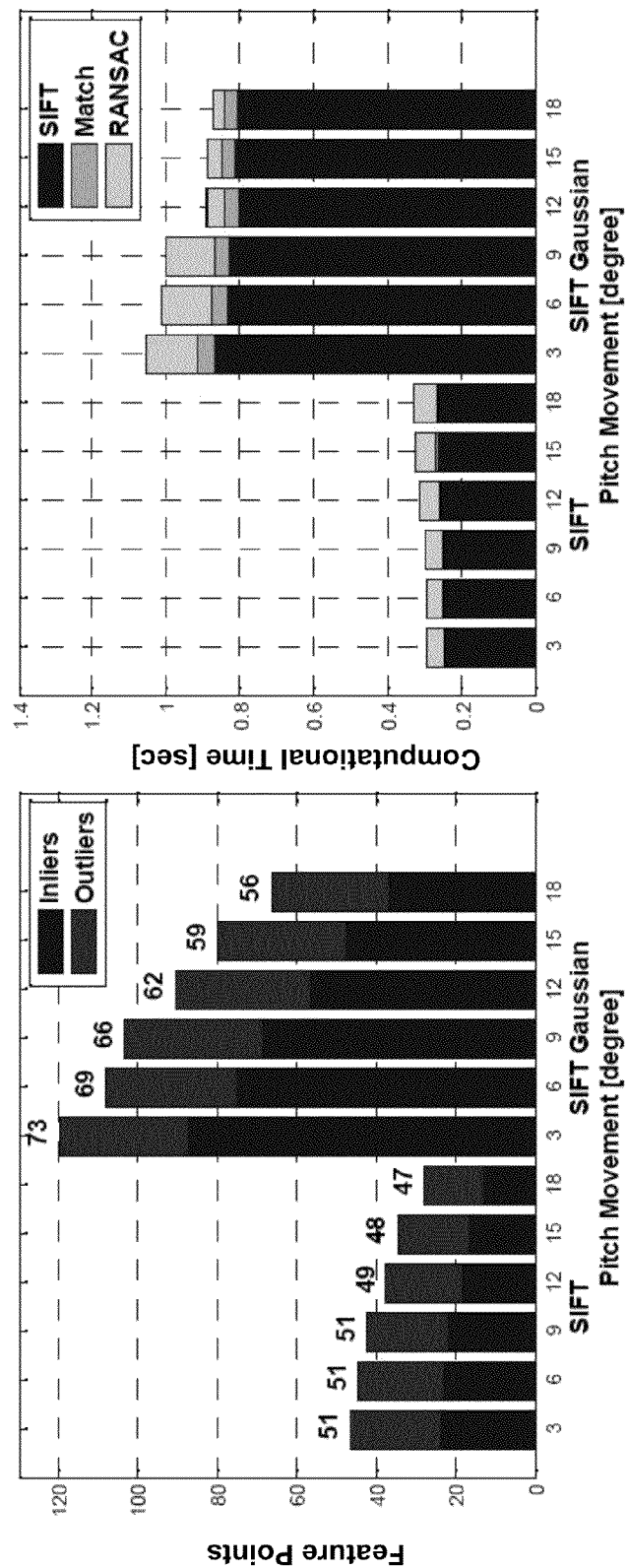
Figure 19:
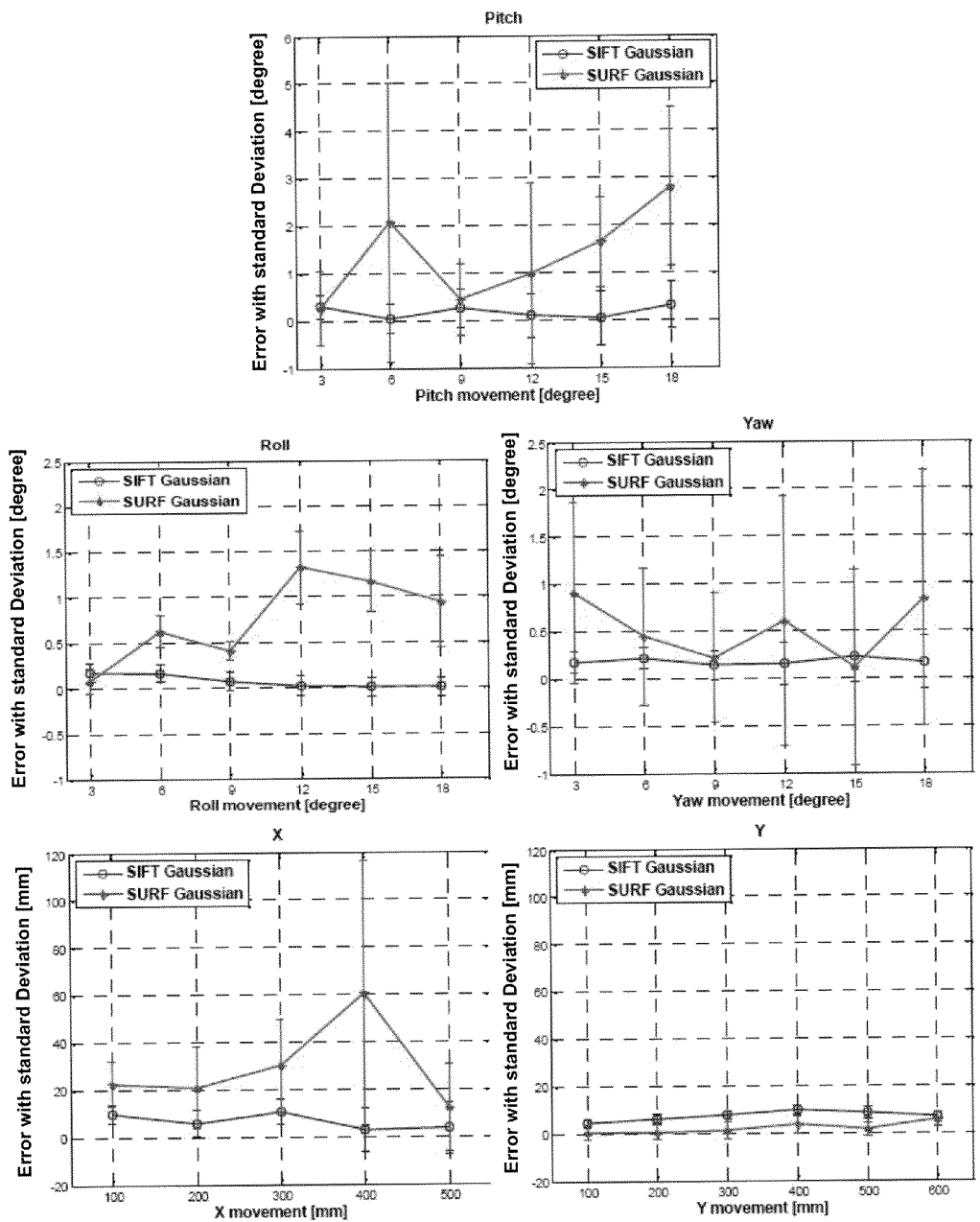
Figure 20:
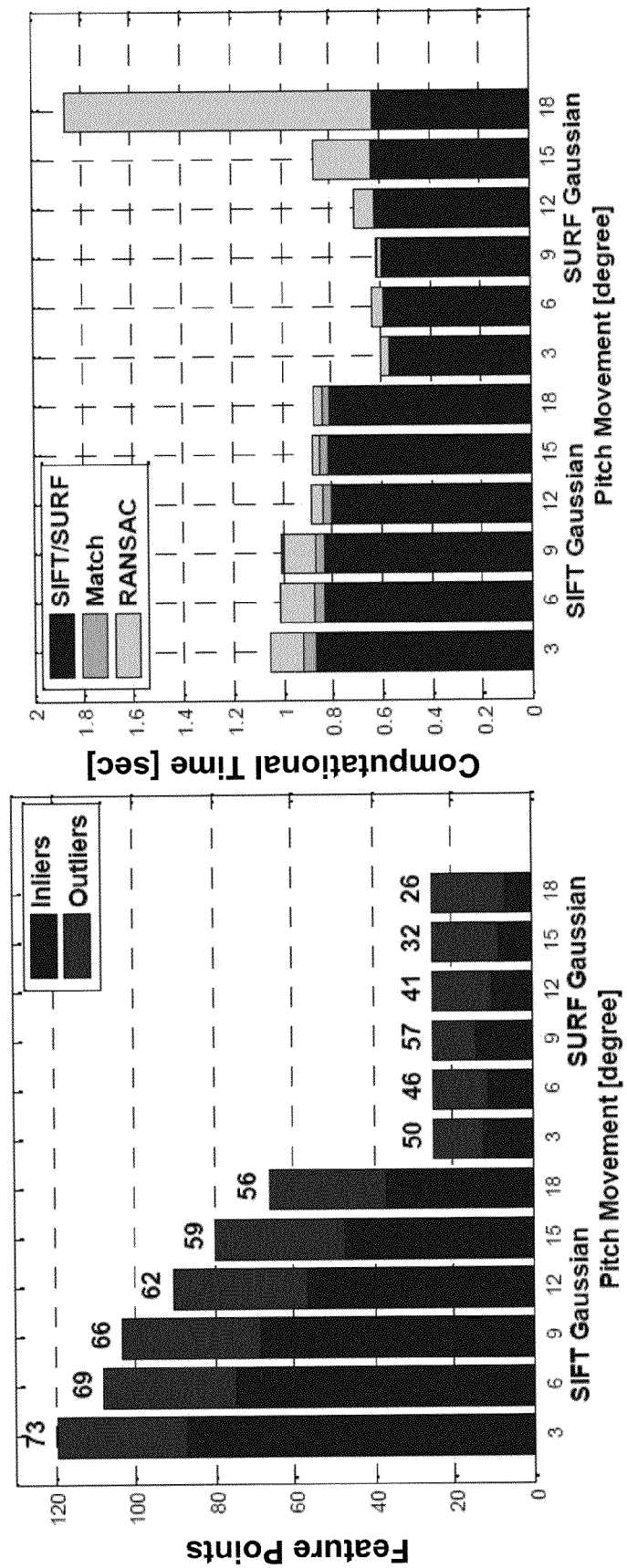

The present disclosure will become more fully understood from the detailed description and the accompanying drawings, wherein:

FIG. 1 illustrates a PRD in accordance with certain embodiments of the present disclosure;

FIGS. 2-4 illustrate another PRD in accordance with certain embodiments of the present disclosure;

FIG. 5 illustrates an implementation of the VR-odometry method performed in accordance with certain embodiments of the present disclosure;

FIG. 6 illustrates the segmentation result of the scene of a stairway in accordance with certain embodiments of the present disclosure;

FIG. 7 illustrates a Recursive Cuts method in accordance with certain embodiments of the present disclosure;

FIG. 8 illustrates the effects of using different similarity functions to partition a SPG in accordance with certain embodiments of the present disclosure;

FIG. 9 illustrates segmentation of the range data of a scene with scattered obstacles in accordance with certain embodiments of the present disclosure;

FIG. 10 illustrates segmentation of the range data of another indoor scene in accordance with certain embodiments of the present disclosure;

FIG. 11 illustrates segmentation of the range data of yet another indoor scene in accordance with certain embodiments of the present disclosure;

FIG. 12 depicts the matched features in two frames before and after the RANSAC process in accordance with certain embodiments of the present disclosure;

FIG. 13 shows an exemplary motion table used to produce ground truth rotation and translation of a PRD in accordance with certain embodiments of the present disclosure;

FIG. 14($a$) illustrates the distributions of the center pixel's intensity and range values in accordance with certain embodiments of the present disclosure;

FIG. 14($b$) shows the distribution plots of the data after applying the Gaussian filter in accordance with certain embodiments of the present disclosure;

FIG. 15 shows the pitch and X error plots and the corresponding derivative plots in accordance with certain embodiments of the present disclosure;

FIG. 16 shows the error bar plot of the pitch measurements in accordance with certain embodiments of the present disclosure;

FIG. 17 illustrates measurement errors with roll, yaw, X and Y movements in accordance with certain embodiments of the present disclosure;

FIG. 18 shows the numbers of inliers and outliers and computational times of the feature extraction and RANSAC processes of the VRO with/without the Gaussian filter in accordance with certain embodiments of the present disclosure;

FIG. 19 shows comparison of the SIFT-based and SURF-based VROs' errors in accordance with certain embodiments of the present disclosure; and FIG. 20 depicts the inliers and outlier numbers and the run time of the SIFT-based and SURF-based VROs under the conditions with pitch movements in accordance with certain embodiments of the present disclosure.

DETAILED DESCRIPTION

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "carrying," "having," "containing," "involving," and the like are to be understood to be open-ended, i.e., to mean including but not limited to.

The description below is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure are directed to a new navigation method for the visually impaired. In certain embodiments, the method uses a single 3D imaging sensor to perform both pose estimation and obstacle detection/avoidance in an unknown 3D indoor environment. Two essential components—the so-called VR-odometry and a range data segmentation method—are introduced and validated. The navigation method is prototyped in the form of a Portable Robotic Device (PRD).

Certain aspects of the present disclosure are directed to innovative computer vision methods for portable blind navigational devices. Certain embodiments utilize a 3D imaging sensor to acquire intensity and range data of the environment. The intensity and range data are simultaneously processed for obstacle detection and wayfinding. Since the approach uses a single 3D imaging sensor, it meets the portability requirement of blind navigational devices. The PRD utilizing the above single-sensor approach can be a new blind navigational device called "smart" cane that may help a blind traveler "see". The smart cane utilizes at least one of: (1) a device pose (3D coordinates x, y, z and orientation—roll $\phi$, pitch $\theta$, yaw $\psi$) estimation method called VR-odometry, which will be described in detail below; (2) a data segmentation method that allows the device to recognize objects and classify them into obstacles and waypoints (stairways, doorway, hallways, etc.); and (3) a tactile device to display the perceived environment to the cane's user. The pose estimation method and waypoint-object detection method ease the travel towards the destination and thus fulfill wayfinding function. They can work in unknown environment, i.e., without requiring a map of the environment. The obstacle detection method "see" environment in 3D and allows the blind traveler to avoid obstacles, including overhung objects and drop-off, efficiently. The tactile device may be used to display environmental information to the traveler in a more intuitive and efficient fashion. Currently there is no existing device that may help a blind people "see" the environment with such detailed and 3D information and locate him/herself in the environment.

FIG. 1 illustrates a PRD in accordance with certain embodiments of the present disclosure. In this example, the perception sensor 102 used in the PRD is a Time-of-Flight (TOF) 3D camera, e.g., the SWISSRANGER SR3000/SR4000. The camera produces both intensity and range images (176×144 pixels/frame) for the scene in its field of view (43.6×34.6 degrees). Its non ambiguity range is 5 meters when a modulation frequency of 30 MHz is used. The programmable modulation frequency (29/30/31 MHz) allows simultaneous measurements of three cameras without interference. The camera's small physical dimension (50×48×65 mm3) makes it well suited to a PRD. A Handheld Navigational Aid (HNA) 106 is built for data acquisition and algorithm validation. The HNA consists of a Handheld Sensing Unit (HSU) 110 for perception, a portable (e.g. handtop) computer 114 for image data acquisition and processing, and a Bluetooth headset 118 for human-device interaction.

Operating Principle of the Smart Cane.

FIGS. 2-4 illustrates another PRD in accordance with certain embodiments of the present disclosure. In this example, the PRD is a smart cane system, which is a computer vision enhanced white cane. A blind traveler uses the smart cane in the same way as he/she uses a conventional white cane. However, the computer vision enhancement can help him/her "see" better/farther. For example, the smart cane system 200 includes a 3D imaging sensor 202 that is installed on a conventional white cane 206, a portable computer 210, a wireless headset 214, and a tactile device 218 such as a wristband or belt. The computer 210, headset 214 and wristband/belt 218 are worn by a blind traveler in the way as shown in FIG. 2. The headset 214 is in communication with the computer 210, for example, wirelessly through Bluetooth. The 3D imaging sensor 202 and the tactile device 218 can be connected to the computer through USB ports. The 3D imaging sensor 202 is powered by battery on the cane while the tactile display 218 is powered by USB port. Alternatively, a separate portable computer (such as a GUMSTIX computer) can be attached to the white cane to acquire data from the 3D imaging sensor and transfer the data to the main portable computer (worn by the traveler) by Wi-Fi connection. The tactile device 218 can be connected to the main portable computer 210 by Bluetooth. These electronics can be classified into two categories according to their usages: computer vision and human-device interaction.

The computer vision methods include an ego-motion estimation method termed VR-Odometry (VRO) and a Recursive Cuts (RC) method for 3D data segmentation. Both methods run in parallel in the computer to process imaging data from the sensor. The VRO method estimates the device's pose change in real time and track the device's pose to produce the device's position and orientation. The RC method segments 3D range data into planar and non-planar surfaces for obstacle detection and object recognition.

The wireless headset 214 and the tactile device 218 are used for human-device interaction. The wireless headset 214 provides a speech communication interface. On one hand the blind traveler may speak what he/she wants the device to do, for examples, "return to the entrance," "go to room 201," etc, on the other hand the device announces navigational information such as obstacle, waypoints, etc. to the blind traveler. A text to speech and speech to text interface software will be developed for human-device communication. The tactile device 218 is an added device-to-human interface that notifies the blind traveler the required travel direction and/or the detected object by directly rendering its shape or using Braille. The tactile device 218 works together with the speech interface to make human-device communication more efficient.

The Smart Cane 200 has two modes, passive mode and active mode. In its passive mode the blind traveler determines the destination of travel and thus the direction of movement with the obstacle/object information provided by the smart cane. For example, the smart cane 200 can announce whatever it detects ahead of the traveler, for instance, overhung obstacle, drop-off, or stairway. The traveler will then determine which way to go. In the active mode, the traveler specifies where he/she wants to go using the speech interface. The Smart Cane 200 then performs path planning and determines the direction of movement by using the detected obstacle/object information.

Imaging Sensor.

In certain embodiments, the PRD employs a sensor that is a Time-of-Flight (TOF) 3D imaging sensor, for example, the SWISSRANGER SR4000 by MESA Imaging AG located at Technoparkstrasse 1 8005 Zuerich Switzerland. The sensor illuminates its entire environment with diffuse and modulated infrared light. Based on phase shift measurement, it detects the range values up to 5 meters (with 1 cm accuracy) for every points sensed by the imaging pixels (176*144=25344 pixels). The sensor produces a 3D range image and an intensity image simultaneously at a rate up to 54 frames per second. The sensor's modulation frequency is programmable and thus allows simultaneous use of multiple sensors without interference. The sensor has a field of view of 43.6*34.6 degrees. It has a physical dimension of 50*48*65 mm$^3$ that makes it well suited to a portable device. As it will be appreciated by one skilled in the art, other suitable-sized imaging sensors that simultaneously provide intensity/color image and 3D range data can be used in the PRD.

VR-Odometry.

In certain embodiments, the PRD employs a pose estimation method to perform feature detection and matching in the intensity images are acquired by the 3-D imaging sensor and use the matched features' range data to determine the pose change in two consecutive image frames. The method is termed VR-Odometry (VRO) as it uses both visual and range data to determine the pose change.

In certain embodiments, a SIFT (Scale-Invariant Feature Transform) feature detector C[1] is used to extract SIFT features in an intensity image and match them to the SIFT features in the next intensity image. As the 3D coordinates of the matched features are known from the range data, the feature-matching process in fact solves the 3D points correspondence (data association) problem at each two sampling steps, and result in two 3-D data sets, $\{p_i\}$ and $\{p'_i\}$; i=1, ..., N. N is the number of matched SIFT features in the two image frames. The pose estimation problems is then to find a rotation and translation matrices, R and T, that minimize the error residual $$e^2 = \Sigma_{i=1}^{i=N} \|p'_i - Rp_i - T\|^2 \qquad (1)$$

This least-square data sets fitting problem can be solved by the Singular Value Decomposition (SVD) method in C[1]. As feature-matching in intensity images may result in incorrect data association (outliers), a RANSAC (Random Sample Consensus) process is implemented to reject the outliers. The method includes:

1) extracting the SIFT features in two consecutive images, finding the matched features, and locating the corresponding 3D data sets $\{p_i\}$ and $\{p'_i\}$;
2) randomly selecting 4 associated points from the two data sets and form $\{p_k\}$ and $\{p'_k\}$; k=1, . . . , 4, and finding the least-square rotation and translation matrices ($\hat{R}_k$ and $\hat{T}_k$) for $\{p_k\}$ and $\{p'_k\}$;
3) projecting the entire data set $\{p_i\}$ onto $\{p'_i\}$ using the found transformation ($\hat{R}_k$ and $\hat{T}_k$) and compute the error $$e_i^2 = \|p'_i - \hat{R}_k p_i - \hat{T}_k\|^2 \quad (2)$$

for each data-pair i=1, . . . , N, wherein a threshold $\epsilon$ is used to score $S_k$ for this transformation: $S_k$ is incremented once for each $e_i^2 < \epsilon$; and
4) repeating steps 2 and 3 for a number of iterations. This number may be a predetermined number and is sufficiently large or it can be determined based on the estimated inlier ratio of the data-pairs at each iteration. The transformation with the highest score is recorded. The corresponding data sets $\{p_j\}$ and $\{p'_j\}$; j=1, . . . , $S_k$, where each data-pair satisfy the threshold test in step 3, are selected and used to compute the maximum likelihood transformation estimate $\hat{R}$ and $\hat{T}$ by the SVD least-square fitting method. The PRD's rotation can be computed from $\hat{R}$ and its translation is determined by $\hat{T}$. The pose change is thus determined.

FIG. 5 illustrates an implementation of the VR-odometry method performed in accordance with certain embodiments of the present disclosure. For example, the VR-odometry method can be performed in a Matlab environment. FIG. 5 illustrates how the VRO finds the correct correspondences between features in two successive images. The images were captured when a 3D imaging sensor such as SR4000 moved in a hallway. FIG. 5(a) depicts the detected SIFT features. They were matched with the features in the next frame based on the SIFT features' scales and orientations. FIG. 5(b) shows the initial matches that exhibit some outliers (mismatches). A RANSAC (RANdom SAmple Consensus) process removed the outliers and the result is shown in FIG. 5(c). Further, accumulated pose change can be obtained by integrating the VR-odometry's pose change data over time or by tracking the incremental pose changes by using an information filter.

The VR-odometry method is advantageous over the existing methods including inertial pose estimation (by integrating pose change measured by a gyro and an accelerometer) and visual odometry D[1] methods. Unlike the inertial method, the VR-odometry's measurement error does not grow with time and therefore it is much more accurate than the inertial approach. Compared with the visual odometry approach, the VR-odometry's pose measurement is consistent over distance because the time-of-flight range measurement has consistent accuracy over distance. On the contrary, the visual odometry's accuracy degrades with increasing distance because its sensor's (stereovision) range measurement accuracy degrades when the distance increases.

3D Data Segmentation.

In certain embodiments, a range data frame generated by the 3-D imaging sensor can be represented as a tri-band color image where each pixel's RGB values represent the x, y components of the surface normal and the depth information (Y value) of the corresponding point. This scheme encodes a 3D point's local geometric information (surface normal) and global information (location) into a pixel in the color image. The RGB image is termed an Enhanced Range Image (ERI) since it enhances the edges and surfaces of objects in the original range image. For example, the method in A[15] can be adopted, and a set of range data can be represented as a tri-band color image where each pixel's RGB values represent the x, y components of the surface normal $\vec{N} = [n_x, n_y, n_z]$ and the depth information (Y value) of the corresponding 3D point. The following mapping for color coding is used:

$$\begin{cases} R = k_1 \cos^{-1} n_x \\ G = k_2 \cos^{-1} n_y \\ B = k_3 Y \end{cases} \quad A(2)$$

where $k_1$, $k_2$ and $k_3$ are positive constants that scale the pixel's RGB values and map them into the range [0, 255]. It should be noted that: (1) the use of x and y components is sufficient to represent the surface normal since $n_z = \sqrt{1 - n_x^2 - n_y^2}$; (2) the row and column indices and the blue component (i.e., the Y value) of the tri-band image pixel fully determines the 3D coordinates of the corresponding data point. This means that the scheme encodes a 3D point's local geometric information (surface normal) and global information (location) into a pixel in the color image.

Normalized Cuts (NC) method can be utilized for range image segmentation. Further, L*u*v color space is selected for an ERI due to its perceptual uniformity. The segmentation method includes:

(1) partitioning the ERI into groups by a region growing method, wherein each group, called a Super-Pixel (SP), contains a cluster of homogeneous pixels whose corresponding 3D points form a planar surface;

(2) constructing a Super-Pixel Graph (SPG) by treating each SP as a node, and recursively partitioning the graph into two segments (using the NC method) until each segment is planar or contains only one SP; and (3) merging adjacent planar segments with the same orientation. Therefore, the SPs produced by the region growing algorithm will substantially reduce the node number of the graph and thus the computational cost; the use of NC-based partitioning method will alleviate the region growing method's sensitivity to noise; and a similarity description using both color information and 3D data information will ensure a reliable segmentation result. The method introduces a feasible exit condition to terminate the graph partitioning process and remove the need of a prespecified segment number N. Some related technical details are explained below.

Computation of Data Statistics.

The statistics of the 3D data points in a segment can be obtained by fitting the Least-Square Plane (LSP) to the data points. Let the normal to the LSP be denoted by $\vec{N} = (n_x, n_y, n_z)$, and the residual of the fit is computed by $\Delta = \sqrt{\sum_{k=1}^{P} d_k^2 / P}$, where P denotes the number of pixels in the segment and $d_k$ is the distance from the $k^{th}$ data point $(x_k, y_k, z_k)$ to the LSP. The LSP can be found by the SVD method that minimizes $\Delta$ (refer to D[1, 2]). A segment with a sufficiently small $\Delta$, i.e., $\Delta < \delta$, is labeled as a planar segment. The angle between planar segments i and j is computed by $\theta_{i,j} = \cos^{-1}(\vec{N}_i \cdot \vec{N}_j)$. They are considered as parallel if $\theta_{i,j}$ is sufficiently small, i.e., $\theta_{i,j} < \epsilon$.

Graph Construction.

A SPG G=(V,E) is constructed by taking each SP as a node and calculate the similarities (i.e. edge weight) between nodes i and j as:

$$w_{i,j} = e^{-\frac{\|F(i)-F(j)\|_2^2}{\sigma_F}} \begin{cases} e^{-\frac{d_{i,j}}{\sigma_D}} & \text{if } V_i \text{ and } V_j \text{ are neighbors} \\ 0 & \text{otherwise,} \end{cases} \quad A(3)$$

where $\sigma_F$ and $\sigma_D$ are positive constants, F(p) is the L*u*v color vector of node p for p=i, j, and $d_{i,j}$ is the Euclidean distance between the LSPs of SPs i and j (i.e., nodes i and j). If $\theta_{i,j} < \epsilon$ is satisfied, then $d_{i,j}$ is the distance from the centroid of the data in SP i to the LSP of the data in SP j. Otherwise, $d_{i,j}=0$. Two SPs are considered as neighbors if they have at least two neighboring pixels in the ERI space. The edge weight computation in Eq. A(3) takes into account the statistics of 3D data points. This results in reliable segmentation results (as demonstrated in FIG. 6). An edge weight matrix W is created by calculating all edge weights of the graph.

Recursive Partition of SPG.

The proposed method, called Recursive Cuts (RC), recursively partition the SPG into a set of planar segments S={$s_1$, $s_2$, ..., $s_N$}. FIG. 7 illustrates a RC method in accordance with certain embodiments of the present disclosure. The method is illustrated in FIG. 7 where an empty circle represents an unclassified SP and a solid circle represents a SP classified as a planar segment. The method recursively partitions the SPG by using the edge weight matrix W until the data of each node forms a planar segment (i.e., $\Delta < \delta$) or the node contains only one SP. To account for the scenario with a slim object, the maximum value of the distances from the data points of the SPG to their LSP, $d_{max}$, can be jointly used with $\Delta$ in the RC method. $d_{max}$ and $\Delta$ are obtained by fitting the least-square plane to the data points in the SPG. The pseudo code of the RC method is depicted as follows:

```
Pseudo code of Exemplary algorithm
Function RC (G,W)
Input: G with associated weight matrix W
Output: A set of planar segment S
IF (G contains only one SP)
    Add G to S
    IF (U is non-empty)
        Pop G2 from U
        G=G2, W=W_G2
        Return RC(G,W)
    Else
        Return S
ELSE
    Find LSP of G and calculate Δ and d_max
    IF (Δ<δ and d_max<λ)
        Add G to S
        IF (U is non-empty)
            Pop G2 from U
            G=G2, W=W_G2
            Return RC(G,W)
        ELSE
            Return S
    ELSE
        Partition G into G1 and G2 using NC method
        Add G2 to U
        G=G1, W=WG1
        Return RC(G,W)
W_G1 and W_G2 are the weight matrices of G1 and G2, respectively. λ is a
predefined threshold. G is a SPG to be partitioned.
```

In the RC code, a last-in-first-out stack U is used to track the nodes that are unvisited. The RC terminates if U is empty and G is a planar segment (or it contains only a single SP).

Merging of Planar Segments.

A binary matrix K={$k_{i,j}|_{i=1,...,n; j=1,...,n}$} is constructed to record the neighborhood relationship among segments in S, where $k_{i,j}=1$ if $s_i$ and $s_j$ are neighbors and $\theta_{i,j}<\epsilon$; and 0, otherwise. It is noted that a segment is treated as its own neighbor. Therefore, $k_{i,j}=1$. To extract planar surfaces, segments i and j are merged if $k_{i,j}=1$ for i=1, ..., n and j=1, ..., n. This is done by using the depth first search algorithm.

FIG. 6 demonstrate the segmentation result of the scene of a stairway in accordance with certain embodiments of the present disclosure. After the segmentation process, neighboring planar surfaces are stored in a tree data structure that will be traversed to determine the structural constituent of the scene and to identify objects such as stairways, hallways, etc.

The RC method is new in at least two aspects. First, it utilizes a new similarity function to perform graph cut. The function encodes local information (surface normal, distance between segments in 3D space, and distance between image pixels) and global information (pixels' coordinates) to achieve a reliable segmentation result. Second, it employs plane-fitting statistics to automatically terminate the recursive cuts and thus does not require a prespecified segment number.

Extended Normalized Cuts.

In certain embodiments, another exemplary technique is proposed for 3D range data segmentation. This technique, called Extended Normalized Cuts (ENC), is an improved segmentation method. It follows the above-mentioned scheme except that it uses a new similarity function for computing the edge weights of a SPG where the SPs are obtained from an ERI by using the Mean Shift clustering method.

The motivation for the ENC is that the mean color based similarity (in Eq. A(3)) may be inaccurate for range data segmentation. This is because two neighboring SPs (in the same planar surface) along Y axis may have significant differences in their mean colors (blue component in this case) and thus produce a small similarity value (edge weight). This is in conflict with the fact that they should have a large similarity as they belong to the same planar surface. In other words, the mean color based similarity may lead to misclassification in range data segmentation. To overcome this problem, a new similarity measure based on the distance-weighted mean color as describe below is utilized.

The ENC differs from the above segmentation method in the following:

Creation of Super-Pixels from ERI.

The ERI is clustered into a number of SPs by the Mean Shift (MS) algorithm.

Computation of the New Similarity Measure.

The computation of the new similarity measure between two neighboring super pixels $SP_i$ and $SP_j$ are explained as follows:

a) Compute the centroid locations $c_i$ and $c_j$ of $SP_i$ and $SP_j$, respectively.

b) Compute the Euclidean distances, $d_k^{ij}$ for k=1, ..., $n_i$, from the $k^{th}$ pixel of $SP_i$ to $c_j$ and $d_l^{ji}$ for l=1, ..., $n_j$, from the $l^{th}$ pixels of $SP_j$ to $c_i$. $n_i$ and $n_j$ are the numbers of image pixels in $SP_i$ and $SP_j$, respectively.

c) Calculate the Distance-Weighted Mean Color (DWMC) for the pixels in $SP_i$ by:

$$M_i = \frac{\sum_{k=1}^{n_i} e^{-d_k^{ij}} p_k^i}{n_i} \quad A(4)$$

where $P_k^i$ represents the color vector of the $k^{th}$ pixel in $SP_i$. $M_i$ is computed in such a way that a pixel in $SP_i$ closer to $c_j$ contributes more to the DWMC. An exponential function is used to calculate the distance-weight that decays as $d_k^{ij}$ increases. Similarly, $M_j$ of $SP_j$ is computed by:

$$M_j = \frac{\sum_{l=1}^{n_j} e^{-d_l^{ji}} p_l^j}{n_l} \quad A(5)$$

Substituting $F_i$ and $F_j$ in Eq. A(1) with $M_i$ and $M_j$, the new similarity function is obtained as follows:

$$w_{i,j} = e^{-\frac{\|M_f - M_j\|_2^2}{\sigma_M}} \begin{cases} e^{-\frac{d_{i,j}}{\sigma_D}} & \text{if } V_i \text{ and } V_j \text{ are neighbors} \\ 0 & \text{otherwise,} \end{cases} \quad A(6)$$

For an n-node SPG, the edge weights are computed and recorded in an n×n matrix W by using Eq. A(6).

Merging of Planar Segments in S.

To merge neighboring planar segments, a binary matrix $K=\{k_{i,j}|i=1,\ldots,t;j=1,\ldots,t\}$ is first constructed to record the neighborhood relationships among segments in S, where $$k_{i,j} = \begin{cases} 1 & \text{if } s_i \text{ and } s_j \text{ are neighbors and } \theta_{i,j} \leq \varepsilon, d_{i,j} \leq \tau \\ 0 & \text{otherwise} \end{cases} \quad A(7)$$

It is noted that a segment is treated as the neighbor of its own. Therefore, $k_{i,i}=1$. Then those segments with k=1 can be merged by using the depth first search algorithm and extract the entire planar surfaces from the range data.

In summary, the ENC plane extraction method includes the following:
a) Construct the ERI from the range data and apply the MS algorithm to obtain a number of SPs.
b) Obtain planar $SP_i$; for i=1, . . . , m from the resulted SPs according to Section III.B.
c) Construct a SPG G on $SP_i$; for i=1, . . . , m and compute the similarity matrix W of order m×m by Eq. A(6).
d) Apply the RC algorithm to G with Was the input. The recursive partitioning process results in a set of planar segments $S=\{s_1, s_2, \ldots, s_N\}$, each of which contains a number of SPs.
e) Construct a binary matrix K to record the neighborhood relationships of the segments in S.
f) Extract the entire planar surfaces by merging those segments whose k values equal one.

Experimental Results.

The effects of the two similarity functions are first evaluated. FIG. 8 illustrates the effects of using different similarity functions to partition a SPG in accordance with certain embodiments of the present disclosure. FIG. 8(a) and FIG. 8(b) show the scene of the experiment and the ERI, respectively. FIG. 8(c) depicts the SPs obtained after applying the MS method to the ERI. The result immediately after applying the RC method (step d above) that uses the mean color based similarity function (Eq. A(1)) is shown in FIG. 8(d). It can be observed that region 802 consists of planes belonging to two different surfaces, the floor and the ramp. FIG. 8(e) shows the result after applying the RC method that uses the proposed similarity function (Eq. A(6)). It can be seen that the use of the proposed similarity function produces correct segmentation result with a smaller number of segments. This demonstrates that the proposed similarity function is more efficient than the mean color based similarity function.

The entire plane extraction method has been validated with range data captured from the SR-3000/4000 in various indoor environments. For the results shown in this section, an unlabelled segment is represented in black and a labeled segment (a planar segment) with a random non-black color. The labeled segments are then overlaid on the ERI. For comparison purpose, each of the two similarity functions is used to extract planar surfaces. For simplicity, the Mean Color Similarity function based method is termed the MCS segmentation method and the DWMC Similarity function based method is termed the DWMCS segmentation method.

To compare the segmentation methods' performances, a Segmentation Quality Index (SQI) is defined as:

$$SQI = \frac{R - A}{A}, \quad A(8)$$

where A is the actual number of planes that are hand labeled in the experiments and R is the number of the resulting planes by the segmentation method. The sign of SQI indicates over-segmentation (positive sign) or under-segmentation (negative sign) and the magnitude of SQI represents the segmentation quality. A SQI value closer to 0 indicates a better segmentation result.

In the first example, FIG. 9 illustrates segmentation of the range data of a scene with scattered obstacles in accordance with certain embodiments of the present disclosure. FIG. 9(a) shows the actual scene. FIG. 9(b) shows the ERI of the scene. In FIG. 9(c) the nine prominent planes of the scene that are marked manually are shown. After applying the MS algorithm, 280 SPs are obtained as shown in FIG. 9(d). The extracted planes using the MCS and DWMCS methods are shown in FIG. 9(e) and FIG. 9(f), respectively. From a qualitative perspective, the DWMCS method is able to extract the entire floor as a single contiguous region from the near-field to far-field of the camera even if the floor surface is fragmented by the obstacles. Whereas the MCS results in a fragmented floor (FIG. 9(e)) that consists of 3 regions that actually belong to plane 1 as labeled in FIG. 9(c). This demonstrates that the DWMCS method is able to capture the "global picture" of a scene in presence of local discontinuity, an important capability for a robot to plan its path in a global sense when navigating in a cluttered environment.

To quantify the segmentation performance, the SQIs of the MCS and DWMCS methods are calculated. In this example, A=9, $R_{MCS}$=24, $R_{DWMCS}$=15. Therefore, $SQI_{MCS}$=1.66 and $SQI_{DWMCS}$=0.66. This means that the DWMCS method outperforms the MCS method.

Another example was carried out to examine the method's performance in extracting ramps (or inclined surfaces) which are common in indoor scenes. One such representative scene and its segmentation results are shown in FIG. 10. The DWMCS method extracts the inclined surface (Plane labeled 2 in FIG. 10 (c)) with less fragmentation as compared to the MCS method. The DWMCS method results in 2 segments (FIG. 10(f)) for plane 2 while the MCS method produces 11 segments. The SQIs of both methods are also computed. In this experiment A=7, $R_{MCS}$=31, $R_{DWMCS}$=13, resulting in $SQI_{MCS}$=3.42 and $SQI_{DWMCS}$=0.85. $SQI_{DWMCS}$ is much closer to 0, indicating a better segmentation result of the DWMCS method.

From the perspective of navigating a mobile robot, the segmentation result of the DWMCS method is more navigation-ready while the result of the MCS method requires further processing such as determining the traversability between the segments on the ramp and if each segment has sufficient space for the robot to travel.

Yet another example was carried out in an indoor scene consisting of common furniture such as chairs as shown in FIG. 11(a). The method's performance in segmenting the planar surfaces in presence of more complex obstacles is tested. A chair can be a complex obstacle to a robot, since the robot may need to determine whether it can pass through the space under the chair. The robot needs to analyze the opening between the chair's legs and the height of its seat (plane 5 in FIG. 11(c)).

The results in FIG. 11(e) and FIG. 11(f) show that both methods extract the legs and seats of the chairs. However, the DWMCS method results in less fragmented walls. The quality of segmentation is evaluated by computing the SQL. Here $A=12$, $R_{MCS}=24$, $R_{DWMCS}=19$, yielding $SQI_{MCS}=2.0$ and $SQI_{DWMCS}=0.58$ Again, the DWMCS method outperforms the MCS method.

The examples demonstrate that the proposed DWMC similarity function can result in a better segmentation result than the mean color similarity function. Because the proposed plane extraction method is recursive, it may perform segmentation in a fully automatic manner and thus eliminate the need for a pre-specified segment number.

Tactile Device.

FIG. 4 illustrates tactile devices 218 in accordance with certain embodiments. The first device 402 show in FIG. 4(b) is a tactile display device consisting of an array of micro actuators 406 fabricated by Micro-Electro-Mechanical Systems (MEMS) technology. The array 406 is built into a wristband or a belt. When the blind traveler wears the wristband/belt, the actuator array 406 is in contact with his/her skin. Each actuator can be electrically activated or deactivated. In this example, at least two forms of activation can be used. One is vibration, i.e., once activated an actuator will produce vibration. Another form is pressure, i.e., once activated the actuator will expand and exert pressure on the user's skin. Used together with the auditory interface, the tactile device can display the geometric information of the environment to the traveler or communicate with the traveler through "tactile text" such as Braille or stroke-patterns predefined. FIG. 4(d) shows coin vibrating motors that can be used to build the actuators.

FIG. 4(c) illustrates another device, i.e., a Direction Indicating Device (DID) 422 consisting a row of vibrators 426 in a loop, which may be worn as a wristband or a belt at the waist. Various vibration patterns can be defined to convey motion command to the traveler. An exemplary vibration pattern includes: (1) Vibration from a single vibrator 426 indicates the desired travel direction. (The front/left/right vibrator indicates moving straight ahead, turning 90 left/right. A vibrator 426 in between indicates a moderate turn.) (2) Vibration from all vibrators 426 in the front half ring indicates a stop of forward movement. (3) Travel speed can be coded into the strength/duration of vibration. (3) Combined patterns on vibration strength/duration can be used to convey different messages to the user, which will be determined in a later stage of the project.

Performance Evaluation of a Pose Estimation Method.

Pose Estimation (PE) is an essential capability for a mobile robot, including the PRD described above, to perform its critical functions including localization and mapping. In a 3D space, a robot pose refers to its attitude (roll, pitch, yaw angles) and position (X, Y, Z coordinates). This is referred to as 6D pose. In an environment without the support of navigational infrastructure (GPS, active beacons, etc.), a robot may calculate its pose via dead reckoning by using data from an Inertial Measurement Unit (IMU) and wheel odometry or by tracking the features detected by its vision sensor in the operating environment. The former is a proprioceptive approach as it does not use any external reference and the latter is an exteroceptive one as it tracks environmental features (external references) over time. The measurement accuracy of an IMU is subject to bias drifts of its motion sensors (accelerometers) and rotation sensors (gyros) that accrue pose errors in over time. Wheel odometry alone cannot provide a reliable estimate of movement due to wheel slip. A PE system based on an IMU and/or wheel odometry may accumulate a large pose error with time and may completely fail in case of excessive wheel slip (e.g., when a robot moves on loose soil).

Exteroceptive PE methods are less prone to these problems as they use static external references to determine changes in robot pose. LADARs B[1]-[3] have been widely used for PE. A 3D LADAR B[3] is currently costly and is not suitable for a small robot due to its large dimension. When a 2D LADAR is used for 6D pose estimation, a scanning mechanism is needed to rotate the entire sensor for generating 3D data B[1], [2]. Such a system has a low frame rate and is often too bulky for a small robot. The existing LADAR based PE methods solve the data association problem using geometry features (shapes, corner points) in the data. Most employ the Iterative Closest Point (ICP) or its variants B[1]-[3]. The ICP approach requires an initial guess of pose that moves the data close enough to the model to alleviate the local minimum problem. In addition, the ICP method cannot find a solution when the environment is featureless (e.g., a flat surface). Visual features are often more available in the operating environment of a robot. They may even exist in a geometrically featureless environment. The representative approach to PE with visual features is Visual Odometry (VO) B[4]-[9], which employs a stereovision system to estimate ego-motion by detecting and tracking the visual features in the stereo image pairs from frame to frame. The 3D positions of the features in each frame are determined by stereo matching. Feature tracking is performed by spatial correlation search. The search methods B[4][5] require an initial estimate of the motion that is obtained from wheel odometry and inertial sensors. Feature matching can also been achieved by using feature descriptors B[6], [7]. This feature matching approach does not perform a spatial correlation search and thus does not require an initial motion estimate. However the feature descriptors need to be salient and robust to scale change and rotation in order for the VO method to work well with a large frame-to-frame movement. Although the VO method is suitable for a small robot, the use of a stereovision system imposes significant limitations on autonomous robot navigation. First, the depth measurement error of a stereovision system grows quadratically with the true distance, meaning that the VO's PE accuracy drop off quickly with increasing distances of feature points. Second, stereovision systems cannot produce a fully dense set of depth data of the scene due to featureless image regions. As a result, stereovision data is not reliable for obstacle avoidance. This problem is usually resolved by using additional perception sensor(s) such as a LADAR. This multi-sensor approach is, however, not suitable for navigating a small robot.

Flash LIDAR 3D imaging sensors can simultaneously produce intensity and range images of the scene at a video frame rate. It has the following advantages over stereovision systems: (1) it measures depth by Time-Of-Flight (TOF) and therefore has consistent measurement accuracy in its full range; and (2) it may return fully dense depth data across its field-of-view. The commercially available Flash LIDAR includes the SwissRanger B[17] and TigerEye 3D B[18] cameras. In B[11], [12], a sensor suite that pairs a SwissRanger 3D camera with a conventional video camera was used for PE. SIFT features were extracted from the video image. The corresponding 3D points of the SwissRanger's range data were determined by an interpolation and search process. The data association process incurs computation time and a precise pixel-to-pixel match cannot be achieved. To overcome these drawbacks, the authors of this paper introduced a PE method B[14] based on a single 3D camera—the SwissRanger SR4000. In the PE method, SIFT features were extracted from the SR4000's intensity image and the features' corresponding range data were used as the 3D data points for PE. This is a precise pixel-to-pixel match and no search process is needed. Since the method simultaneously uses Visual and Range data for PE, it was termed VR-Odometry (VRO). The work in B[14] only presents a proof of concept study of the VRO that uses the sensor's raw data. A similar PE method was presented in B[13] where the SURF descriptor was employed for feature detection and matching. The motivation was that the SURF descriptor has similar performance to SIFT but is much faster according to the recent study B[15]. However, it is not clear from B[13] if the PE accuracy and computational cost of the SURF-based method are satisfactory. In B[11], [13] the SwissRanger SR-2 and SR-3000 were characterized. The uncertainty of each pixel's range measurement was related to its intensity value and the bias of the range measurement was related to the intensity and true range values. These statistical data were then used by an information filter to estimate the robot pose over multiple time steps.

In order for the VRO to provide sufficiently accurate PE for the portable blind navigational device as conceived in B[14], the following are investigated: (1) the impacts of the noises in the SR4000's intensity and range data to the VRO's PE error; and (2) the performances of the SIFT and SURF descriptors in terms of PE error and computational cost. The pose measurement over two image frames (i.e., two time steps) is used to benchmark the VRO's performance. A thorough characterization of the PE method based on a 3D TOF camera is provided here.

SWISSRANGER SR4000.

In accordance with certain embodiments of the present disclosure, the SwissRanger SR4000, which is a 3D TOF camera, can be utilized. The SR4000 operates like a 2D digital camera, but measures the range to all objects in its field of view (the scene). The camera illuminates the scene with modulated infrared light and focuses the image onto the 3D camera's Focal Plane Array (FPA). Each pixel on the FPA measures the TOF, and thus distance, based on phase shift. The final result is a fully dense range image. The camera also produces an intensity image simultaneously. Table I summarizes the key specifications of the 3D camera. The camera is small in size, but it is able to produce dense 3D data points (176×144=25,344 points) per frame at a fast frame rate (up to 50 frames per second).

TABLE I

Specifications of the SR4000

| PIXEL ARRAY SIZE | 176 (h) × 144 (v) |
| Field of View | 43° (h) × 34° (v) |
| Non-ambiguity Range | 5 m |
| Angular Resolution | 0.24° |
| Absolute Accuracy | ±10 mm (typical) |
| Dimension | 65*65*68 mm³ | h: horizontal, v: vertical

VR-Odometry.

As described above, the VRO employs a local feature detector to extract features in current intensity image and match them to the features in the next intensity image by the feature descriptors. As the features' 3D coordinates are known, the feature-matching process results in two 3D data sets, $\{p_i\}$ and $\{q_i\}$ for i=1, . . . N. The rotation and translation matrices, R and T, between these two image frames can be determined by minimizing the error residual $e^2 = \Sigma_{i=1}^{i=N} \|p_i - Rq_i - T\|^2$. This least-squares data fitting problem can be solved by the Singular Value Decomposition (SVD) method as described in B[16]. As the feature-matching based on the local descriptors may result in incorrect correspondences (outliers), a RANSAC (Random Sample Consensus) process is implemented to reject the outliers. The method includes:

1) detecting features in two consecutive intensity images, find the matched features based on the feature descriptors and form the corresponding 3D data sets $\{p_i\}$ and $\{q_i\}$, wherein the steps 2 & 3 are repeated for k, k=2, . . . , K, times until a termination criteria is met;
2) drawing a sample by randomly selecting 4 associated point-pairs from the two data sets to form $\{p_m\}$ and $\{q_m\}$ for m=1, . . . , 4, and finding the least-squares rotation and translation matrices ($R_k$ and $T_k$) for $\{p_m\}$ and $\{q_m\}$;
3) projecting the entire data set $\{q_i\}$ onto $\{p_i\}$ by the found transformation and compute error $e_i^2 = \|p_i - R_k q_i - T_k\|^2$; i=1, . . . , N for each point-pair, wherein a threshold τ is used to score the support $S_k$ for this transformation ($R_k$ and $T_k$). $S_k$ is incremented once for each $e_i^2 < \tau$; and
4) recording the transformation with the highest score, wherein the corresponding data sets $\{p_j\}$ and $\{q_j\}$ for j=1, . . . , $S_k$ (in which each data-pair past the threshold test of step 3) are selected and used to compute the maximum likelihood estimate of $\hat{R}$ and $\hat{T}$ of the camera by the SVD method, and wherein the camera's Euler angles are computed from $\hat{R}$ and its translation is determined by $\hat{T}$.

FIG. 12 depicts the matched features before and after the RANSAC process. More details of the VRO method can be found in B[10]. In B[10], the RANSAC process was terminated at a fixed K number, which might result in an unnecessarily long computation time. In this example, the value of K is automatically determined based on the property of the samples.

Given the true inlier ratio E, the minimum number of repetitions required to ensure, with some level of confidence q, that data sets $\{p_j\}$ and $\{q_j\}$ are outlier-free, can be computed by $$K_{min} = \frac{\log(1 - \eta)}{\log(1 - \varepsilon^m)} \quad (1)$$

This number is then used to terminate the RANSAC according to the standard termination criteria B[19]. In this example m=4 and n=0.99 are used. In fact, the true inlier ratio E is a priori unknown. An estimate on this ratio can be found by using the sample which currently has the largest support. This estimate is then updated as the RANSAC process proceeds.

The total computational time of the RANSAC process is determined by the values of $K_{min}$ and N (the total number of the 3D data points).

Experimental Setup.

FIG. 13 shows an exemplary motion table used to produce ground truth rotation and translation of a PRD in accordance with certain embodiments of the present disclosure. The motion table consists of a TRACLabs Biclops pan/tilt unit and a Techno Linear Slider driven by a servo motor. The motion table has a ±60° tilt and ±180° pan ranges with an angular resolution of 0.018°. It has a 3-meter linear movement range with 0.007 mm resolution.

A desktop computer with a 3.30 GHz AMD Phenom™ II X6 1000T processor and 4 GB memory is used to process the intensity and range data. All statistical results are computed by using 540 data frames of the SR4000. This sample number is determined based on the Central Limit Theorem and the statistical results of the VRO B[10].

Noise Analysis.

In B[10], it is demonstrated that the PE error of the VRO using raw sensor data follows a Gaussian distribution. Noises in the SR4000's range data directly contribute to the VRO error while noises in the intensity data may result in error in feature detection and eventually produce error in PE. To analyze the noises of the SR4000's intensity and range data, 540 image frames are taken from the sensor in a typical office environment and plot the distributions of the intensity and range values of each pixel. It is found that both intensity and range values follow Gaussian distributions, meaning that the noises in the intensity and range data are Gaussian noises. FIG. 14($a$) illustrates the distributions of the center pixel's intensity and range values. Other distribution plots are omitted for simplicity.

A 3*3 low pass Gaussian filter ($\sigma=1$) is applied to the intensity and range images. The Gaussian filter reduces the noises (i.e., the standard deviations of the data). However, it blurs the images and thus shifts the mean values. FIG. 14($b$) shows the distribution plots of the data after applying the Gaussian filter, from which it can seen that the filtering process substantially reduces the standard deviations but only slight changes the mean values.

To quantify the noise levels of the raw and filtered data of the SR4000, the noise ratio (i.e., the ratio of the standard deviation to the mean) of each pixel in the intensity and range data can be computed. Table II shows the maximum, mean and minimum noise ratios in a typical data frame. It can be seen that the Gaussian filter reduces the overall noise levels (the mean noise ratio) of the intensity and range data by 57% and 64%, respectively. The experiment is carried out with different scenes and the results are similar.

TABLE II

NOISE RATIO OF RAW AND FILTERED SR4000 DATA

| Noise Ratio (%) | | Raw Data | Filtered Data | Noise Reduction |
|---|---|---|---|---|
| Intensity | Maximum | 25.51 | 11.58 | 55% |
| | Mean | 2.29 | 0.99 | 57% |
| | Minimum | 0.47 | 0.42 | 11% |
| Range | Maximum | 38.32 | 9.04 | 76% |
| | Mean | 1.51 | 0.55 | 64% |
| | Minimum | 0.31 | 0.12 | 61% |

The maximum, mean and minimum is computed from 25344 (176 × 144) pixels.

As the remaining noises cannot be ignored, their effects on PE need to be analyzed. They will be investigated in the next two sections.

Minimum Number of Matched Points for VRO.

The pose change between two image frames can be computed from three matched data points. This scheme only works well with noise-free range data. When the range data contain noise, more matched data points are required to attain a sufficiently small PE error. In this example, this issue is investigated through simulation experiments.

Let a noise-free point set be denoted by $\{p_i\}$; i=1, ..., N. A predetermined transformation, i.e., a pose change given by ($\theta$, $\phi$, $\psi$, x, y, z), is applied to $\{p_i\}$ to generate a new data set $\{q_i\}$. This means that data points in $\{p_i\}$ are matched to those in $\{q_i\}$ by the given rotation and translation. Gaussian noise is then added to each point in $\{p_i\}$ and $\{q_i\}$. This produces data sets $\{p'_i\}$ and $\{q'_i\}$ that simulate the SR4000's range data. The transformation matrices, R' and T', between $\{p'_i\}$ and $\{q'_i\}$ can be computed by the SVD method described above. The corresponding pose change ($\phi'$, $\theta'$, $\psi'$, x', y', z') are then determined and treated as the pose measurement. To reflect the noise characteristics of the SR4000's range data, the sensor's maximum, mean and minimum noise ratios (in Table II) are used to generate the simulated range data. The pose measurement error $\delta=(\delta_\phi, \delta_\theta, \delta_\psi, \delta_x, \delta_y, \delta_z)=(\phi'-\phi, \theta'-\theta, \psi'-\psi, x'-x, y'-y, z'-z)$ for each case using different number of matched points is then computed. Each element of S and its absolute derivate $|d\delta|$ are plotted against the number of matched points that are used for computing the pose change.

The results show that: (1) Each element of $\delta$ decreases gradually with increasing number of matched points; and (2) each element of $|d\delta|$ decreases with the number of matched points. More importantly, $|d\delta_\phi|$, $|d\delta_\theta|$ and $|d\delta_\psi|$ stay within the SR4000's angular resolution (0.24°) and $|d\delta_x|$, $|d\delta_y|$ and $|d\delta_z|$ are within the SR4000's absolute accuracy (10 mm) when the number of matched points is not smaller than 12. Therefore, 12 are selected as the Minimum Number of Matched Points (MNMP) for PE. FIG. 15 shows the pitch and X error plots and the corresponding derivative plots. The other plots are omitted for conciseness. FIG. 15 shows PE error versus number of matched points under conditions with different noise levels. The threshold values depicted by the green lines in the top-right and bottom-right graphs are the SR4000's angular resolution and absolute accuracy, respectively.

It is noted that the MNMP depends on the threshold values. A larger/smaller threshold value results in a smaller/larger MNMP. Decreasing the MNMP will increase the success rate of PE with a larger PE error. Therefore, the MNMP should be carefully selected according to the system specification. The MNMP may be used to indicate a failure of the VRO when the number of initial matched featured (based on the feature discriptors) is smaller than the MNMP. In this case, the VRO should skip the current frame of data and move to the next frame, or be replaced by an auxiliary PE means, if available.

PE Error and Computational Time. Accuracy and repeatability of VRO.

As demonstrated above, the Gaussian filter drastically reduces the noise in the SR4000's data. Thus, the filtering process may substantially reduce the VRO's PE error.

Experiments are performed to examine the PE error (with/without the Gaussian filter) for each individual motion (roll, pitch, yaw, X or Y movement in this case). The SIFT feature extractor is used in the experiments. In the first experiment, the SR4000 undergoes pitch movements over the range [3°, 18°] (increment: 3°/step). 540 frames are captured before and after each pitch rotation for computing the pose change.

FIG. 16 shows the error bar plot of the pitch measurements. FIG. 16 shows error bars of the pitch measurements. The mean error of each measurement is plotted with an error bar of ±1σ. σ is the standard deviation. It can be observed that the use of the Gaussian filter resulted in a much better repeatability of pitch estimation: the standard deviation was reduced by 1.7~2.9 times. The Gaussian filter slightly shifts the mean error. This change is within [−0.3°, 0.3°]. It is small compared with the reduction in the standard deviation, which is 1.3°~2.9°. Similar experiments are carried out to test the VRO errors with roll, yaw, X and Y movements. The results are depicted in FIG. 17. FIG. 17 illustrates measurement errors with roll, yaw, X and Y movements in accordance with certain embodiments of the present disclosure. For roll measurement, the Gaussian filter slightly reduced the mean errors but retained similar standard deviations. Both the mean errors and standard deviations are within the SR4000's angular resolution (0.24°). For yaw measurement, the Gaussian filter causes significant reductions in the standard deviations but slightly shifts the mean errors, a similar result as observed in the pitch measurement. Again, both the mean errors and standard deviations are within the SR4000's angular resolution. One common feature in the pitch and yaw measurements is that the standard deviations tend to grow with increasing rotation angle.

For X measurement, both the mean errors and standard deviations are reduced by the Gaussian filter. Their values are around the absolute accuracy of the SR4000 (±10 mm). The standard deviation of the VRO with Gaussian filter grows with increasing X movement. For Y measurement, the Gaussian filter lowers the standard deviations but slightly increases the mean errors. However, both of them are within the absolute accuracy of the SR4000. It can be observed that the measurement errors of X movements are larger than that of Y movements. This is because the same amount of movement in X axis results in a larger movement of features in the image plane (equivalent to a larger pith or yaw movement) than it does in Y axis and hence a large measurement error. The quantitative results of the measurement accuracy and repeatability of the VRO with the Gaussian filter are tabulated in Tables III and IV.

TABLE III

PE Errors in Rotation Measurement

| TV: (φ, θ, ψ) | MV: (μ, σ) | | |
|---|---|---|---|
| | Roll φ (°) | Pitch θ (°) | Yaw ψ (°) |
| (3, 0, 0) | (0.17, 0.11) | (0.06, 0.07) | (0.04, 0.06) |
| (6, 0, 0) | (0.16, 0.10) | (0.02, 0.06) | (0.03, 0.07) |
| (9, 0, 0) | (0.07, 0.10) | (0.07, 0.06) | (0.05, 0.06) |
| (12, 0, 0) | (0.02, 0.11) | (0.09, 0.07) | (0.01, 0.07) |
| (15, 0, 0) | (0.00, 0.10) | (0.05, 0.08) | (0.11, 0.09) |
| (18, 0, 0) | (0.01, 0.11) | (0.12, 0.08) | (0.03, 0.07) |
| (0, 3, 0) | (0.07, 0.11) | (0.30, 0.25) | (0.05, 0.25) |
| (0, 6, 0) | (0.00, 0.13) | (0.03, 0.31) | (0.46, 0.33) |
| (0, 9, 0) | (0.07, 0.15) | (0.27, 0.41) | (0.56, 0.35) |
| (0, 12, 0) | (0.04, 0.17) | (0.09, 0.46) | (0.81, 0.42) |
| (0, 15 0) | (0.16, 0.21) | (0.02, 0.56) | (0.95, 0.49) |
| (0, 18, 0) | (0.14, 0.23) | (0.29, 0.49) | (0.61, 0.46) |
| (0, 0, 3) | (0.02, 0.07) | (0.09, 0.13) | (0.17, 0.11) |
| (0, 0, 6) | (0.02, 0.08) | (0.09, 0.14) | (0.21, 0.11) |
| (0, 0, 9) | (0.01, 0.08) | (0.18, 0.16) | (0.14, 0.16) |
| (0, 0, 12) | (0.03, 0.09) | (0.18, 0.2) | (0.15, 0.22) |
| (0, 0, 15) | (0.01, 0.12) | (0.22, 0.22) | (0.23, 0.27) |
| (0, 0, 18) | (0.01, 0.11) | (0.2, 0.21) | (0.17, 0.28) |

MV: Measured Values, TV: True Values, μ: mean error, σ. standard deviation.

TABLE IV

PE Errors in Translation Measurement

| TV: (X, Y, Z) | MV: (μ, σ) | | |
|---|---|---|---|
| | X (mm) | Y (mm) | Z (mm) |
| (100, 0, 0) | (9.8, 4.0) | (0.4, 1.4) | (3.3, 2.4) |
| (200, 0, 0) | (5.6, 5.5) | (2.7, 1.7) | (3.9, 2.9) |
| (300, 0, 0) | (10.5, 5.2) | (3.4, 1.6) | (7.7, 3.6) |
| (400, 0, 0) | (2.8, 8.9) | (4.7, 2.7) | (6.9, 6.8) |
| (500, 0, 0) | (3.4, 10.7) | (5.5, 2.5) | (0.8, 7.3) |
| (0, 100, 0) | (1.4, 2.8) | (4.3, 1.7) | (3.4, 2.7) |
| (0, 200, 0) | (2.8, 2.8) | (6.2, 1.7) | (2.5, 3.1) |
| (0, 300, 0) | (0.9, 2.7) | (7.7, 1.8) | (0.3, 3.5) |
| (0, 400, 0) | (3.3, 3.1) | (9.5, 1.8) | (3.3, 3.7) |
| (0, 500, 0) | (12.6, 4.8) | (8.5, 2.5) | (6.1, 4.9) |

MV: Measured Values, TV: True Values, μ: mean error, σ. standard deviation

It is noted that for the second group of data (i.e., the sensor undergoes pitch movements), some of the pitch/yaw measurements incur larger mean errors and standard deviations. It may be because the data has larger noise ratios.

Computational Time of VRO.

It is found that in the experiments that the Gaussian filter increases the number of SIFT features in each filtered intensity image and resulted in a much larger number of initially matched features with a higher inlier ratio. Therefore, the computational time for feature extraction increases significantly. The RANSAC computational time may increase or decrease, depending on the values of $K_{min}$ and N of each case. However, it accounts for a much smaller portion of the total VRO computational time. As a result, the use of the Gaussian filter results in a much higher computational time for the VRO. FIG. 18 shows the numbers of inliers and outliers and computational times of the feature extraction and RANSAC processes of the VRO with/without the Gaussian filter in the cases with various pitch movements.

Performance Comparison of Feature Extractors.

The SURF is a representative robust feature descriptor with a higher computational efficiency than the SIFT. It has been used for robot PE in the literature B[13]. However, no quantitative study on its PE performance has been reported so far. In this section, the SURF-based VRO is compared with that of the SIFT-based VRO. In both cases, the Gaussian filter was used to reduce the noise ratios of the data.

Accuracy and Repeatability.

The two VROs' mean errors and standard deviations through extensive experiments are compared with individual movements (roll, pitch, yaw, X and Y). FIG. 19 shows comparison of the SIFT-based and SURF-based VROs' errors. FIG. 19 shows one of the experimental results. It can be observed that the SIFT-based VRO exhibits a much better accuracy and repeatability in PE. The only exception is the Y measurement where the SURF-based VRO has slightly smaller mean errors and the SIFT-based VRO has smaller standard deviation. However, both methods' PE errors are within the SR4000 absolute accuracy. This means that they have similar performance in measuring Y movement. A closer examination into the SURF-based VRO reveals that: (1) For the measurements in Y movements, the SURF feature extractor produces sufficient number of inliers and thus results in PE errors comparable to that of the SIFT-based VRO; (2) In all other cases, the number of inliers produced by the SURF feature extractor is lower than the MNMP and therefore, the use of the SURF descriptors results in much larger PE errors.

Computational Time.

FIG. 20 depicts the inliers and outlier numbers and the run time of the SIFT-based and SURF-based VROs under the conditions with pitch movements in range [3°, 18°]. It can be seen that the SIFT extractor produced many more features with a much higher inlier ratio than the SURF counterpart for each pitch movement. Also, the computational time of the SURF is ~200 ms smaller than that of the SIFT. For the SURF-based VRO, the RANSAC computational time may drastically increase and outnumber the computational time of feature extraction when the inlier ratio is very low (e.g., the case with 18° pitch movement). Similar results can be obtained in the cases with other individual movements. FIG. 20 shows inlier and outlier numbers (left) and the computational time (right) of the SIFT-based and SURF-based VROs with pitch movements. The numbers on top of the bar graph in the left are inlier ratios in percentage.

In general, the use of the SURF may save some computational time, not significant overall, for the VRO at an unacceptable cost of losing too much PE accuracy and repeatability.

PE Error with Combinatory Motion.

Since the SIFT feature extractor outperforms the SURF extractor, the SIFT-based VRO was selected for PE. Its PE accuracy and repeatability are further investigated under conditions with combinatory motion (both rotation and translation). The results are tabulated in tables V & VI.

TABLE V

Measurement of Rotation ($\theta, \psi$) and Translation (Y)

| | MV: ($\mu, \sigma$) | | |
|---|---|---|---|
| TV: ($\psi, \theta, Y$) | Pitch $\theta$ (°) | Yaw $\psi$ (°) | Y (mm) |
| (−3, 9, 390) | (0.45, 0.07) | (0.12, 0.06) | (1.23, 1.12) |
| (−6, 3, 196) | (0.31, 0.07) | (0.02, 0.07) | (3.52, 1.49) |
| (−9, 12, 386) | (0.15, 0.22) | (0.16, 0.20) | (3.61, 1.93) |
| (−12, 6, 593) | (0.28, 0.41) | (0.26, 0.57) | (10.90, 4.07) |

MV: Measured Values, TV: True Values, $\mu$: mean error, $\sigma$: standard deviation.

TABLE VI

MEASUREMENT OF ROTATION ($\theta, \psi$) AND TRANSLATION (X)

| | MV: ($\mu, \sigma$) | | |
|---|---|---|---|
| TV: ($\psi, \theta, X$) | Pitch $\theta$ (°) | Yaw $\psi$ (°) | X (mm) |
| (3, 12, 99) | (0.05, 0.08) | (0.55, 0.13) | (13.82, 5.05) |
| (6, 9, 198) | (0.28, 0.10) | (0.78, 0.21) | (19.41, 6.91) |
| (9, 6, 287) | (0.16, 0.20) | (0.80, 0.35) | (22.17, 11.83) |
| (12, 3, 395) | (0.22, 0.20) | (0.90, 0.39) | (28.75, 14.26) |

MV: Measured Values, TV: True Values, $\mu$: mean error, $\sigma$: standard deviation.

The first combinatory motion consists of pitch, yaw and Y movements. Like the results with individual movements (in table III), most of the mean errors and standard deviations of the SIFT-based VRO are within the SR4000's angular resolution and absolute accuracy.

The second combinatory motion consists of pitch, yaw and X movements. While most of the standard deviations are within the sensor's angular resolution and absolute accuracy, many of the mean errors go beyond the boundaries. This conforms to our earlier finding that an X movement results in a larger PE error than a Y movement does. However, the overall PE accuracy and repeatability are still good.

Since a robot's forward movement (along Y axis) usually dominates its side movement (along X axis), the measurement performance in Table V has more significant meaning to robot pose estimation.

The foregoing description of the exemplary embodiments of the invention has been presented only for the purposes of illustration and description and is not intended to be exhaustive or to limit the present disclosure to the precise forms disclosed. Many modifications and variations are possible in light of the above teaching.

The embodiments were chosen and described in order to explain the principles of the present disclosure and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present disclosure is defined by the appended claims rather than the foregoing description and the exemplary embodiments described therein.

Reference List A:

A[1] C. Ye, "Navigating a mobile robot by a traversability field histogram," *IEEE Transactions on Systems, Man, and Cybernetics—Part B: Cybernetics*, vol. 37, no. 2, pp. 361-372, 2007.

A[2] R. Turchetto and R. Manduchi, "Visual curb localization for autonomous navigation," in *Proc. IEEE/RSJ International Conference on Intelligent Robots and Systems*, 2003, pp. 1336-1342.

A[3] Oggier, B. Biittgen, F. Lustenberger, "SwissRanger SR3000 and first experiences based on miniaturized 3D-TOF Cameras," *Swiss Center for Electronics and Microtechnology* (CSEM) *Technical Report*, 2005.

A[4] C. Ye and J. Borenstein, "Characterization of a 2-D laser scanner for mobile robot obstacle negotiation," in *Proc. IEEE International Conference on Robotics and Automation*, 2002, pp. 2512-2518.

A[5] A. J. Abrantes and J. S. Marques. "A class of constrained clustering algorithms for object boundary extraction," *IEEE Transactions on Image Processing*, vol. 5, no. 11, pp. 1507-1521, 1996.

A[6] O. R. P. Bellon and L. Silva, "New improvements to range image segmentation by edge detection," *IEEE Signal Processing Letters*, vol. 9, no. 2 pp. 43-45, 2002.

A[7] X. Jiang, "An adaptive contour closure algorithm and its experimental evaluation," *IEEE Transactions on Pattern Analysis and Machine Intelligence*, vol. 22, no. 11, pp. 1252-1265, 2000.

A[8] A. D. Sappa, "Unsupervised contour closure algorithm for range image edge-based segmentation," *IEEE Transactions on Image Processing*, vol. 15, no. 2, pp. 377-384, 2006.

A[9] R. L. Hoffman and A. K. Jain, "Segmentation and classification of range images," *IEEE Transactions on Pattern Analysis and Machine Intelligence*, vol. 9, no. 5, pp. 608-620, September 1987.

A[10] K. M. Lee, P. Meer and R. H. Park, "Robust adaptive segmentation of range images," *IEEE Transactions on Pattern Analysis and Machine Intelligence*, vol. 20, no. 2, pp. 200-205, 1998.

A[11] A. Hoover, et. al, "An Experimental Comparison of Range Image Segmentation Algorithms," *IEEE Transactions on Pattern Analysis and Machine Intelligence*, vol. 18, no. 7, pp. 673-689, 1996.

A[12] L. Silva, O. Bellon and P. Gotardo. "A global-to-local approach for robust range image segmentation," in *Proc. IEEE International Conference on Image processing*, 2002, pp. 773-776.

A[13] G. M. Hegde and C. Ye, "Swissranger sr-3000 range images enhancement by a singular value decomposition filter," in Proc. IEEE International Conference on Information and Automation (IEEE-ICIA), 2008, pp. 1626-1631.

A[14] J. Malik, S. Belongie, J. Shi and T. Leung, "Textons, Contours and Regions: Cue Combination in Image Segmentation," in *Proc. International Conference on Computer Vision*, 1999, pp. 918-925.

A[15] J. Shi and J. Malik, "Normalized cuts and image segmentation," *IEEE Transactions on Pattern Analysis and Machine Intelligence*, vol. 22, no. 8, pp. 888-905, 2000.

A[16] S. Sarkar and P. Soundararajan, "Supervised learning of large perceptual organization: Graph spectral partitioning and learning automata," *IEEE Transactions on Pattern Analysis and Machine Intelligence*, vol. 22, no. 5, pp. 504-525, 2000.

A[17] Z.-Y. Wu and R. Leahy, "An optimal graph theoretic approach to data clustering: Theory and its application to image segmentation," *IEEE Transactions on Pattern Analysis and Machine Intelligence*, vol. 15, no. 11, pp. 1101-1113, 1993.

A[18] W. Tao, H. Jin and Y. Zhang "Color Image Segmentation Based on Mean Shift and Normalized Cuts," *IEEE Transactions on Systems, Man, and Cybernetics*, part B, vol. 37, no. 5, pp. 1382-1389, 2007.

A[19] G. M. Hegde, C. Ye and G. T. Anderson, "An extended normalized cuts method for real-time planar feature extraction from noisy range image," in *Proc. IEEE International Conference on Intelligent Robots and Systems*, 2010, pp. 1190-1195.

A[21] K. Pulli and M. Pietikainen, "Range image segmentation based on decomposition of surface normals," in *Proc. of the 8th Scandinavian Conference on Image Analysis*, 1993, pp. 893-899.

A[22] C. Ye, "A method for mobile robot obstacle negotiation," *International Journal of Intelligent Control and Systems*, vol. 10, no. 3, pp. 188-200, 2005.

Reference List B:

B[1] D. Cole and P. Newman, "Using laser range data for 3D SLAM in outdoor environments," *Proc. IEEE International Conference on Robotics and Automation*, 2006, pp. 1556-1563

B[2] O. Wulf, A. Nüchter, J. Hertzberg, and B. Wagner, "Benchmarking urban six-degree-of-freedom simultaneous localization and mapping," *Journal of Field Robotics*, vol. 25, no. 3, pp. 148-163, 2008.

B[3] G. Pandey, J. R. McBride, S. Savarese, and R. M. Eustice, "Visually bootstrapped generalized ICP," *Proc. IEEE International Conference on Robotics and Automation*, 2011, pp. 2660-2667.

B[4] Yang Cheng, M. W. Maimone and L. Matthies, "Visual odometry on the Mars exploration rovers—a tool to ensure accurate driving and science imaging," *IEEE Robotics & Automation Magazine*, vol. 13, no. 2, pp. 54-62, 2006.

B[5] M. Agrawal, K. Konolige, R. Bolles, "Localization and mapping for autonomous navigation in outdoor terrains: a stereo vision approach," *Proc. IEEE Workshop on Applications of Computer Vision*, 2007.

B[6] D. Nister, O. Naroditsky and J. Bergen, "Visual odometry," *Proc. IEEE Conference on Computer Vision Pattern Recognition*, 2004, pp. 652-659.

B[7] H. Hirschmüller, P. Innocent, and J. Garibaldi, "Fast, unconstrained camera motion estimation from stereo without tracking and robust statistics," *Proc. International Conference on Control, Automation, Robotics and Vision*, 2002, pp. 1099-1104.

B[8] A. I. Comport, E. Malis and P. Rives, "Accurate quadrifocal tracking for robust 3D visual odometry," *Proc. IEEE International Conference on Robotics and Automation*, 2007, pp. 40-45.

B[9] A. Howard, "Real-time stereo visual odometry for autonomous ground vehicles," *Proc. IEEE/RSJ International Conference on Intelligent Robots and Systems*, 2008, pp. 3946-3952.

B[10] C. Ye and M Bruch, "A visual odometry method based on the SwissRanger SR-4000," *Proc. Unmanned Systems Technology XII Conference at the* 2010 *SPIE Defense, Security, and Sensing Symposium*.

B[11] L. P. Ellekilde, S. Huang, J. V. Miró, and G. Dissanayake, "Dense 3D map construction for indoor search and rescue," *Journal of Field Robotics*, vol. 24, pp. 71-89, 2007.

B[12] W. Zhou, J. V. Miró, and G. Dissanayake, "Information-Driven 6D SLAM Based on Ranging Vision," *Proc. EEEE/RSJ International Conference on Intelligent Robots and Systems*, 2008, pp. 2072-2077.

B[13] J. J. Wang, G. Hu, S. Huang, and G. Dissanayake, "3D Landmarks Extraction from a Range Imager Data for SLAM," *Australasian Conference on Robotics and Automation (ACRA)*, 2009.

B[14] C. Ye, "Navigating a Portable Robotic Device by a 3D Imaging Sensor," *Proc. EEEE Sensors Conference*, 2010, pp. 1005-1010.

B[15] H. Bay, T. Tuytelaars, and L. Van Gool, "SURF: Speeded up robust features," *Computer Vision—ECCV*, 2006, pp. 404-417.

B[16] K. S. Arun, et al, "Least square fitting of two 3-d point sets," *IEEE Transactions on Pattern Analysis and Machine Intelligence*, vol. 9, no. 5, pp. 698-700, 1987.

B[17] http://www.mesa-imaging.ch/

B[18] http://www.advancedscientificconcepts.com/products/tigereye.html

B[19] R. Raguram, J. M. Frahm, and M. Pollefeys, "A comparative analysis of RANSAC techniques leading to adaptive real-time random sample consensus," *Computer Vision—ECCV*, 2008, pp. 500-513.

Reference List C:

C[1] S. Thrun, et al., "Stanley, the robot that won the DARPA Grand Challenge," *J. Field Robotics*, vol. 23, no. 9, pp. 661-692, 2006.

C[2] S. P. Levine, D. A. Bell, L. A. Jaros, R. C. Simpson, Y. Koren, and J. Borenstein, "The Navchair Assistive Wheelchair Navigation System," *IEEE Trans. Rehabilitation Engineering*, vol. 7, no. 4, pp. 443-451, 1999.

C[3] C.-H. Kuo and H. W. Chen, "Human-Oriented Design of Autonomous Navigation Assisted Robotic Wheelchair for Indoor Environments," in *Proc. IEEE Int. Conf. Mechatronics*, 2006, pp. 230-235.

C[4] C. Galindo, J. Gonzalez, and J.-A. Fernández-Madrigal, "Control Architecture for Human-Robot Integration: Application to a Robotic Wheelchair," *IEEE Transactions on Systems, Man, and Cybernetics—Part B: Cybernetics*, vol. 36, no. 5, pp. 1053-1067, 2006.

C[5] Ulrich, I. and Borenstein, J., 2001, "The GuideCane—Applying Mobile Robot Technologies to Assist the Visually Impaired," *IEEE Transaction on Systems, Man, and Cybernetics—Part A: Systems and Humans*, Vol. 31, No. 2, pp. 131-136, 2001.

C[6] V. Kulyukin, C. Gharpure, J. Nicholson, and G. Osborne, "Robot-Assisted Wayfinding for the Visually Impaired in Structured Indoor Environments," *Autonomous Robots*, vol. 21, no. 1, pp. 29-41, 2006.

C[7] D. Bissit and A. Heyes, "An Application of Biofeedback in the Rehabilitation of the Blind," *Applied Ergonomics*, vol. 11, no. 1, pp. 31-33, 1980.

C[8] J. M. Benjamin, N. A. Ali, and A. F. Schepis, "A Laser Cane for the Blind," in *Proc. of San Diego Medical Symposium*, 1973.

C[9] D. Yuan and R. Manduchi, "A Tool for Range Sensing and Environment Discovery for the Blind," in *Proc. IEEE Computer Society Conference on Computer Vision and Pattern Recognition Workshops*, 2004.

C[10] S. Shoval, J. Borenstein, and Y. Koren, "Auditory guidance with the NavBelt—a computerized travel aid for the blind," *IEEE Transactions on Systems, Man, and Cybernetics*, vol. 28, no. 3, pp. 459-467, 1998.

C[11] J. A. Hesch et al., "A 3D Pose Estimator for the Visually Impaired," *Proc. IEEE International Conference on Intelligent Robots and Systems*, 2009.

C[12] D. G. Lowe, "Distinctive image features from scale-invariant keypoints," *International Journal of Computer Vision*, vol. 2, no. 60, pp. 91-110, 2004.

C[13] K. S. Arun, et al., "Least square fitting of two 3-d point sets," *IEEE Transactions on Pattern Analysis and Machine Intelligence*, vol. 9, no. 5, pp. 698-700, 1987.

C[14] C. Ye, "A method for mobile robot obstacle negotiation," *International Journal of Intelligent Control and Systems*, vol. 10, no. 3, pp. 188-200, 2005.

C[15] H. Bay, et al., "SURF: Speeded up Robust Features", *Proc. European Conference on Computer Vision*, 2006.

C[16] A. Hoover, et al., "An experimental comparison of range image segmentation algorithms," *IEEE Transactions on Pattern Analysis and Machine Intelligence*, vol. 18, no. 7, pp. 673-689, 1996.

C[17] G. M. Hegde, C. Ye and G. Anderson, "An Extended Normalized Cuts Method for Real-Time Planar Feature Extraction from Noisy Range Images," *Proc. IEEE International Conference on Intelligent Robots and Systems*, 2010.

Reference List D:

D[1] D. Bissit and A. Heyes, "An Application of Biofeedback in the Rehabilitation of the Blind," *Applied Ergonomics*, vol. 11, no. 1, pp. 31-33, 1980.

D[2] J. M. Benjamin, N. A. Ali, and A. F. Schepis, "A Laser Cane for the Blind," in *Proc. of San Diego Medical Symposium*, 1973.

D[3] D. Yuan and R. Manduchi, "A Tool for Range Sensing and Environment Discovery for the Blind," in *Proc. IEEE Computer Society Conference on Computer Vision and Pattern Recognition Workshops*, 2004.

D[4] S. Shoval, J. Borenstein, and Y. Koren, "Auditory guidance with the NavBelt—a computerized travel aid for the blind," *IEEE Transactions on Systems, Man, and Cybernetics*, vol. 28, no. 3, pp. 459-467, 1998.

D[5] J. A. Hesch et al., "A 3D Pose Estimator for the Visually Impaired," *Proc. IEEE International Conference on Intelligent Robots and Systems*, 2009.

D[6] D. G. Lowe, "Distinctive image features from scale-invariant keypoints," *International Journal of Computer Vision*, vol. 2, no. 60, pp. 91-110, 2004.

D[7] K. S. Arun, et al., "Least square fitting of two 3-d point sets," *IEEE Transactions on Pattern Analysis and Machine Intelligence*, vol. 9, no. 5, pp. 698-700, 1987.

D[8] Y. Cheng, M. W. Maimone, and L. Matthies, "Visual Odometry on the Mars Exploration Rovers—a Tool to Ensure Accurate Driving and Science Imaging," *IEEE Robotics and Automation Magazine*, vol. 13, no. 2. pp. 54-62, 2006.

D[9] C. Ye, "Navigating a Mobile Robot by a Traversability Field Histogram," *IEEE Transactions on Systems, Man, and Cybernetics—Part B: Cybernetics*, vol. 37, no. 2, pp. 361-372, 2007.

D[10] C. Ye, "A Method for Mobile Robot Obstacle Negotiation," *International Journal of Intelligent Control and Systems*, vol. 10, no. 3, pp. 188-200, 2005.

What is claimed is:

1. A portable robotic device (PRD), comprising:
a 3-D imaging sensor configured to acquire first and second intensity data frames and first and second range data frames of an environment of the 3-D imaging sensor, the first intensity data frame corresponding to the first range data frame, the second intensity data frame corresponding to the second range data frame; and
an imaging processing module configured to
identify a first feature in the first intensity data frame and a second feature in the second intensity data frame that match each other,
obtain a first set of 3-D coordinates representing the first feature in the first range data frame and a second set 3-D coordinates representing the second feature in the second range data frame, and determine a pose change of the PRD based on the first and second sets of 3-D coordinates; and
perform 3-D data segmentation of at least one of the first and second range data frames to extract planar surfaces from the at least one range data frame.

2. The device of claim 1, wherein the imaging processing module comprises a Scale-Invariant Feature Transform (SIFT) feature detector configured to extract SIFT features in the first and second intensity data frames, wherein the imaging processing module is configured to identify the first and second features that are SIFT features and that match each other.

3. The device of claim 2, wherein the SIFT feature detector is configured to identify N SIFT features in the first intensity data frame and N SIFT features in the second intensity data frame that match to each other, wherein the imaging processing module is configured to obtain first 3-D data set $\{p_i\}$ representing the N SIFT features from the first range data frame and second 3-D data set $\{p'_i\}$ representing the N SIFT features from the second range data frame, i=1, . . . , N, N being an integer greater than 1; and
wherein the imaging processing module is configured to determine rotation and translation matrices, R and T, between the first and second intensity data frames by minimizing the error residual $e^2 = \Sigma_{i=1}^{i=N} \|p_i - Rq_i - T\|^2$.

4. The device of claim 3, wherein the SIFT feature detector is configured to execute a transformation procedure including:
randomly selecting four associated SIFT features from the first and second data sets to form $\{p_k\}$ and $\{p'_k\}$, k=1, . . . , 4;
finding the least-square rotation and translation matrices ($\hat{R}_k$ and $\hat{T}_k$) for $\{p_k\}$ and $\{p'_k\}$; and
projecting the first data set $\{p_i\}$ onto the second data set $\{p'_i\}$ using the found transformation ($\hat{R}_k$ and $\hat{T}_k$) and computing the error $$e_i^2 = \|p'_i - \hat{R}_k p_i - \hat{T}_k\|^2$$

for each data-pair i=1, . . . , N, wherein a threshold $\epsilon$ is used to score $S_k$ and $S_k$ is incremented once for each $e_i^2 < \epsilon$.

5. The device of claim 4, wherein the SIFT feature detector is configured to
repeat the transformation procedure for a predetermined number of times and identify the executed transformation having the highest score $S_k$;
select the corresponding data sets $\{p_j\}$ and $\{p'_j\}$; j=1, ..., $S_k$, wherein each data-pair satisfy the threshold test in the projecting step, and use the selected corresponding data sets to compute the maximum likelihood transformation estimate $\hat{R}$ and $\hat{T}$ by the SVD least-square fitting method; and
determine a rotation of the PRD from $\hat{R}$ and a translation of the PRD from $\hat{T}$.

6. The device of claim 1, wherein the imaging processing module is configured to
execute a construction procedure for a given point in the at least one range data frame including:
mapping the given point to a corresponding point in a color space in accordance with a predetermined rule; and
generating a pixel for the given point using a color represented by the corresponding point in the color space.

7. The device of claim 6, wherein the imaging processing module is configured to
execute the construction procedure for each point in the at least one range data frame; and
construct a color image using the generated pixel for each point of the at least one range data frame.

8. The device of claim 7, wherein the imaging processing module is configured to apply a Normalized Cuts method to the color image.

9. The device of claim 7, wherein the imaging processing module is configured to cluster a color image into a plurality of homogeneous regions by using a Mean Shift method.

10. The device of claim 9, wherein the imaging processing module is configured to construct a graph by treating each of the plurality of homogeneous regions as a node and recursively partition the graph into two segments using the Normalized Cuts method until each segment is planar or contains only one homogeneous region.

11. The device of claim 10, wherein the imaging processing module is configured to
fit a Least-Square Plane (LSP) to data points of a given segment, wherein a normal to the LSP is denoted by $\vec{N}=(n_x, n_y, n_z)$, and a residual of the fit is computed by $\Delta = \sqrt{\sum_{k=1}^{P} d_k^2}/P$, wherein P denotes the number of pixels in the given segment and $d_k$ is a distance from the $k^{th}$ data point $(x_k, y_k, z_k)$ to the LSP, wherein the LSP is found by a Singular Value Decomposition (SVD) method that minimizes $\Delta$; and
determine that the given segment is a planar segment when $\Delta$ is smaller than a predetermined value $\delta$.

12. The device of claim 11, wherein the imaging processing module is configured to execute a Recursive Cuts procedure comprising:
determining whether a maximum distance between the data points and the LSP is below a threshold $\delta$, and
in response to a determination that the maximum distance is below the threshold $\delta$, exiting the Recursive Cuts procedure.

13. The device of claim 12, wherein the Recursive Cuts procedure further comprises constructing a graph G=(V,E) by taking each planar homogeneous region as a node and calculate similarities between nodes i and j as:

$$w_{i,j} = e^{-\frac{\|F(i)-F(j)\|_2^2}{\sigma_F}} \begin{cases} e^{-\frac{d_{i,j}}{\sigma_D}} & \text{if } V_i \text{ and } V_j \text{ are neighbors} \\ 0 & \text{otherwise,} \end{cases}$$

wherein $\sigma_F$ and $\sigma_D$ are positive constants, F(p) is the L*u*v color vector of node p for p=i,j, and $d_{i,j}$ is a Euclidean distance between the LSPs of the nodes i and j.

14. The device of claim 12, wherein the Recursive Cuts procedure further comprises:
constructing a graph G=(V,E) including H nodes by taking each planar homogeneous region as a node and calculate similarities between nodes i and j as:

$$w_{i,j} = e^{-\frac{\|M_f-M_j\|_2^2}{\sigma_M}} \begin{cases} e^{-\frac{d_{i,j}}{\sigma_D}} & \text{if } V_i \text{ and } V_j \text{ are neighbors} \\ 0 & \text{otherwise,} \end{cases}$$

wherein H is an integer greater than 0, i and j are integers greater than 0 and no greater than H, $M_i$ and $M_j$ are Distance-Weighted Mean Colors, $d_{i,j}$ is a Euclidean distance between the LSPs of the nodes i and j,
wherein $$M_i = \frac{\sum_{k=1}^{n_i} e^{-d_k^{ij}} p_k^i}{n_i}, \text{ and}$$

$$M_j = \frac{\sum_{l=1}^{n_j} e^{-d_l^{ji}} p_l^j}{n_l},$$

wherein $p_k^i$ represents the color vector of the $k^{th}$ pixel in node i, wherein $P_l^j$ represents the color vector of the $l^{th}$ pixel in node j, wherein $d_k^{ij}$ for k=1, ..., $n_i$ is computed from the $k^{th}$ pixel of node i to $c_j$, and $d_l^{ji}$ for l=1, ..., $n_j$ is computed from the $l^{th}$ pixels of node j to $c_i$, wherein $n_i$ and $n_j$ are the numbers of image pixels in node i and node j, respectively, and wherein $c_i$ and $c_j$ are centroid locations of node i and node j, respectively.

15. The device of claim 14, wherein the imaging processing module is configured to
apply the Recursive Cuts procedure to the graph G with W as an input to recursively partition the graph G to a set of planar segments $S=\{s_1, s_2, \ldots, s_N\}$, each of which contains a number of homogeneous regions;
construct a binary matrix K to record neighborhood relationships of the segments in S; and
extract entire planar surfaces by merging those segments whose k values equal one.

16. The device of claim 6, wherein the imaging processing module is configured to map the given point to the corresponding point by using the values of three primary colors of the corresponding point to represent the x, y components of a surface normal $\vec{N}[n_x, n_y, n_z]$ at the given point and a depth information of the given point.

17. The device of claim 16, wherein the imaging processing module is configured to use RGB values to represent the given point in accordance with $$\begin{cases} R = k_1\cos^{-1}n_x \\ G = k_2\cos^{-1}n_y \\ B = k_3 Y \end{cases}$$

wherein Y is a depth at the given point, and wherein $k_1$, $k_2$ and $k_3$ are positive constants that scale the RGB values into a range of 0 to 255.

18. The device of claim 17, wherein the imaging processing module is configured to
execute the construction procedure for each point in the at least one range data frame;
construct a color image using the generated pixel for each point of the at least one range data frame; and
covert the color image to L*U*V color space.

19. A smart cane system, comprising
a cane;
a 3-D imaging sensor attached to the cane and configured to acquire intensity data frames and range data frames of an environment of the 3-D imaging sensor, the intensity data frames corresponding to the range data frames;
a portable computing device configured to process the intensity data frames and range data frames as well as detect a pose of the imaging sensor and an obstacle in the environment based on the processing results;
a headset in communication with the portable computing device and configured to output an audio instruction indicting information associated with the pose or the obstacle; and
a tactile device in communication with the portable computing device and configured to output a tactile instruction indicting information associated with the pose or the obstacle.

20. The smart cane system of claim 19, wherein the 3-D imaging sensor is configured to acquire first and second intensity data frames and first and second range data frames of the environment of the 3-D imaging sensor, the first intensity data frame corresponding to the first range data frame, the second intensity data frame corresponding to the second range data frame;
wherein the portable computing device is configured to
identify a first feature in the first intensity data frame and a second feature in the second intensity data frame that match each other;
obtain a first set of 3-D coordinates representing the first features in the first range data frame and a second set 3-D coordinates representing the second feature in the second range data frame, determine a pose change of the PRD based on the first and second sets of 3-D coordinates; and
perform 3-D data segmentation of at least one of the first and second range data frames to extract planar surfaces from the at least one range data frame.

21. The smart cane system of claim 20, wherein portable computing device comprises a Scale-Invariant Feature Transform (SIFT) feature detector configured to extract SIFT features in the first and second intensity data frames, wherein portable computing device is configured to identify the first and second features that are SIFT features and that match each other;
wherein the SIFT feature detector is configured to identify N SIFT features in the first intensity data frame and N SIFT features in the second intensity data frame that match to each other, wherein portable computing device is configured to obtain first 3D data set $\{p_i\}$ representing the N SIFT features from the first range data frame and second 3D data set $\{p'_i\}$ representing the N SIFT features from the second range data frame, i=1, . . . , N, N being an integer greater than 1;
wherein the portable computing device is configured to determine rotation and translation matrices, R and T, between the first and second intensity data frames by minimizing the error residual $e^2=\Sigma_{i=1}^{i=N}\|p_i-Rq_i-T\|^2$.

22. The smart cane system of claim 21, wherein the portable computing device is configured to execute a construction procedure for a given point in the at least one range data frame, the construction procedure including:
mapping the given point to a corresponding point in a color space in accordance with a predetermined rule; and
generating a pixel for the given point using a color represented by the corresponding point in the color space.

23. The smart cane system of claim 22, wherein the portable computing device is configured to:
execute the construction procedure for each point in the at least one range data frame;
construct a color image using the generated pixel for each point of the at least one range data frame;
cluster the color image into a plurality of homogeneous regions by using a Mean Shift method; and
recursively partition the color image into two segments using a Normalized Cuts method until each segment is planar or contains only one homogeneous region.

24. A method of navigation utilizing a navigational device including a 3-D imaging sensor and an imaging processing module, comprising:
acquiring, at the 3-D imaging sensor, first and second intensity data frames and first and second range data frames of an environment of the 3-D imaging sensor, the first intensity data frame corresponding to the first range data frame, the second intensity data frame corresponding to the second range data frame;
identifying a first feature in the first intensity data frame and a second feature in the second intensity data frame that match each other;
obtaining a first set of 3-D coordinates representing the first feature in the first range data frame and a second set 3-D coordinates representing the second feature in the second range data frame, and determine a pose change of the PRD based on the first and second sets of 3-D coordinates; and
performing 3-D data segmentation of at least one of the first and second range data frames to extract planar surfaces from the at least one range data frame.

25. The method of claim 24, comprising:
extracting, at a Scale-Invariant Feature Transform (SIFT) feature detector, SIFT features in the first and second intensity data frames, and identifying the first and second features that are SIFT features and that match each other;
identifying, at the SIFT feature detector, N SIFT features in the first intensity data frame and N SIFT features in the second intensity data frame that match to each other, wherein the imaging processing module is configured to obtain first 3-D data set $\{p_i\}$ representing the N SIFT features from the first range data frame and second 3-D data set $\{p'_i\}$ representing the N SIFT features from the second range data frame, i=1, . . . , N, N being an integer greater than 1; and
determining, at the imaging processing module, rotation and translation matrices, R and T, between the first and second intensity data frames by minimizing the error residual $e^2=\Sigma_{i=1}^{i=N}\|p_i-Rq_i-T\|^2$.

26. The method of claim 24, comprising:
executing, at the imaging processing module, a construction procedure for each point in the at least one range data frame, wherein the construction procedure for a given point in the at least one range data frame includes:
mapping the given point to a corresponding point in a color space in accordance with a predetermined rule, and
generating a pixel for the given point using a color represented by the corresponding point in the color space;
constructing a color image using the generated pixel for each point of the at least one range data frame;
clustering the color image into a plurality of homogeneous regions by using a Mean Shift method; and
recursively partitioning the color image into two segments using a Normalized Cuts method until each segment is planar or contains only one homogeneous region.

27. The method of claim 26, comprising:
fitting, at the imaging processing module, a Least-Square Plane (LSP) to data points of a given segment, wherein a normal to the LSP is denoted by $\vec{N}=(n_x, n_y, n_z)$, and a residual of the fit is computed by $\Delta=\sqrt{\sum_{k=1}^{P} d_k^2}/P$, wherein P denotes the number of pixels in the given segment and $d_k$ is a distance from the $k^{th}$ data point $(x_k, y_k, z_k)$ to the LSP, wherein the LSP is found by a Singular Value Decomposition (SVD) method that minimizes $\Delta$; and
determining that the given segment is a planar segment when $\Delta$ is smaller than a predetermined value $\delta$.

28. The method of claim 27, comprising executing a Recursive Cuts procedure including
determining whether a maximum distance between the data points and the LSP is below a threshold $\lambda$, and
in response to a determination that the maximum distance is below the threshold $\lambda$, exiting the Recursive Cuts procedure;
wherein the Recursive Cuts procedure further comprises (a):
constructing a graph G=(V,E) by taking each planar homogeneous region as a node and calculate similarities between nodes i and j as:

$$w_{i,j} = e^{-\frac{\|F(i)-F(j)\|_2^2}{\sigma_F}} \begin{cases} e^{-\frac{d_{i,j}}{\sigma_D}} & \text{if } V_i \text{ and } V_j \text{ are neighbors} \\ 0 & \text{otherwise,} \end{cases}$$

wherein $\sigma_F$ and $\sigma_D$ are positive constants, F(p) is the L*u*v color vector of node p for p=i,j, and $d_{i,j}$ is a Euclidean distance between the LSPs of the nodes i and j;
or (b):
constructing a graph G (V,E) including H nodes by taking each planar homogeneous region as a node and calculate similarities between nodes i and j as:

$$w_{i,j} = e^{-\frac{\|M_f-M_j\|_2^2}{\sigma_M}} \begin{cases} e^{-\frac{d_{i,j}}{\sigma_D}} & \text{if } V_i \text{ and } V_j \text{ are neighbors} \\ 0 & \text{otherwise,} \end{cases}$$

wherein H is an integer greater than 0, i and j are integers greater than 0 and no greater than H, $M_i$ and $M_j$ are Distance-Weighted Mean Colors, $d_{i,j}$ is a Euclidean distance between the LSPs of the nodes i and j,
wherein $$M_i = \frac{\sum_{k=1}^{n_i} e^{-d_k^{ij}} p_k^i}{n_i}, \text{ and}$$

$$M_j = \frac{\sum_{l=1}^{n_j} e^{-d_l^{ji}} p_l^j}{n_l},$$

wherein $p_k^i$ represents the color vector of the $k^{th}$ pixel in node i, wherein $P_l^j$ represents the color vector of the $l^{th}$ pixel in node j, wherein $d_k^{ij}$ for k=1, ..., $n_i$ is computed from the $k^{th}$ pixel of node i to $c_j$, and $d_l^{ji}$ for l=1, ..., $n_j$ is computed from the $l^{th}$ pixels of node j to $c_i$, wherein $n_i$ and $n_j$ are the numbers of image pixels in node i and node j, respectively, and wherein $c_i$ and $c_j$ are centroid locations of node i and node j, respectively.

* * * * *